US012204524B1

(12) United States Patent
Birru et al.

(10) Patent No.: US 12,204,524 B1
(45) Date of Patent: Jan. 21, 2025

(54) METHOD AND SYSTEM FOR ELECTRONIC PROCESSING OF USER QUERIES MAINTAINING FACTUAL CONSISTENCY DURING PROCESSING

(71) Applicant: Quantiphi, Inc, Marlborough, MA (US)

(72) Inventors: Dagnachew Birru, Marlborough, MA (US); Muneeswaran I, Mumbai (IN); Saisubramaniam Gopalakrishnan, Mumbai (IN); Vishal Vaddina, Mumbai (IN)

(*) Notice: Subject to any disclaimer, the term of this patent is extended or adjusted under 35 U.S.C. 154(b) by 0 days.

(21) Appl. No.: 18/457,610

(22) Filed: Aug. 29, 2023

(51) Int. Cl.
*G06F 16/23* (2019.01)
*G06F 16/901* (2019.01)
*G06F 16/903* (2019.01)

(52) U.S. Cl.
CPC ...... *G06F 16/2365* (2019.01); *G06F 16/9024* (2019.01); *G06F 16/90335* (2019.01)

(58) Field of Classification Search
None
See application file for complete search history.

(56) References Cited

U.S. PATENT DOCUMENTS

| 8,682,913 | B1* | 3/2014 | Betz | G06F 16/3329 |
| | | | | 707/804 |
| 11,972,223 | B1* | 4/2024 | DeFoor | G06F 40/40 |
| 2023/0061906 | A1* | 3/2023 | Gaur | G06F 16/243 |
| 2024/0095468 | A1* | 3/2024 | Tunstall-Pedoe | G06N 3/0895 |
| 2024/0289395 | A1* | 8/2024 | Zhou | G06F 16/9532 |

* cited by examiner

*Primary Examiner* — Dawaune A Conyers
(74) *Attorney, Agent, or Firm* — RC Trademark Company

(57) ABSTRACT

A method for electronic processing of user queries maintaining factual consistency during processing includes receiving a user query, executing a hybrid retrieval operation, generating a context information space that includes a set of paragraph output from the paragraph retrieval operation, a set of triplet output from the triplet retrieval operation, and a set of graphs output from the graph retrieval operation. Furthermore, generating a first prompt instruction to generate an intermediate rationale as explanation output and performing an automatic fact-checking operation to verify the explanation output and re-feeding the user query along with the generated explanation output to the generative language model to derive an answer output that is succinct in one or more language parameters as compared to the generated explanation output. The answer output includes a verified and evidence-supported answer and at least one fact reference from first set of factual information with reduced hallucinations and factual inconsistencies.

19 Claims, 13 Drawing Sheets

METHOD AND SYSTEM FOR ELECTRONIC PROCESSING OF USER QUERIES MAINTAINING FACTUAL CONSISTENCY DURING PROCESSING

FIELD OF TECHNOLOGY

The present disclosure generally relates to information processing and retrieval in the field of search and natural language generation and reasoning technologies. Specifically, the present disclosure relates to a method and a system for the electronic processing of user queries by maintaining and/or enhancing factual consistencies in natural language generation through hybrid information retrieval and generative processing.

BACKGROUND

Generally, large language models (LLMs) are used for natural language generation and reasoning that is responsible for utilizing a retrieved relevant data from diverse data sources with different data formats and data types for generating a human-like response (or natural language text) and explanations based on the retrieved data. For example, the diverse data stored in different locations and data sources, such as images, documents, videos, graphs, and the like are parsed every single time for retrieving the required data. However, the retrieval of the relevant information is tricky for existing large language models due to the difficulty in determining the accuracy and consistency of the retrieved data.

There is a technical problem of factual inconsistencies or hallucinations that can arise in generative language models (e.g., large language models (LLMs). The term hallucination refers to the tendency of the models to produce text that appears to be correct but is actually false. Further, aiding to this, is the technical issue of performance optimization challenges, due to sheer data volume and variety of data to be retrieved from diverse sources having diverse formats (text, graph, triplets, and images etc.) posing technical challenge in timely retrieval and processing. Thus, how to maintain factual consistency throughout search or information retrieval process is a major challenge.

Further limitations and disadvantages of conventional approaches will become apparent to one of skill in the art through comparison of such systems with some aspects of the present disclosure, as set forth in the remainder of the present application with reference to the drawings.

BRIEF SUMMARY OF THE DISCLOSURE

The present disclosure provides a method and a system for the electronic processing of user queries by maintaining factual consistency during processing. The present disclosure seeks to provide a solution to the existing problem of factual inconsistencies or hallucinations that can arise in generative language models (e.g., large language models (LLMs). Further, aiding the above-mentioned existing problem, the present disclosure also seeks to provide a solution to the existing problem of performance optimization due to the retrieval and processing of a variety of data from diverse sources having diverse formats (text, graphs, triplets, images, and the like). An aim of the present disclosure is to provide a solution that overcomes at least partially the problems encountered in the prior art and provide an improved method and an improved system for the electronic processing of the user queries by maintaining the factual consistency during processing that resolves major issues present in generative language models, such as hallucination and complex factual reasoning.

In one aspect, the present disclosure provides a method for the electronic processing of user queries maintaining factual consistency during processing. The method comprises receiving, by a server, a user query from a client device. Furthermore, the method comprises executing, by the server, a hybrid retrieval operation comprising a paragraph retrieval operation, a triplet retrieval operation, and a graph retrieval operation to retrieve a first set of factual information based on the user query from a plurality of diverse data sources and generating a context information space comprising a set of paragraph output from the paragraph retrieval operation, a set of triplet output from the triplet retrieval operation and a set of graphs output from the graph retrieval operation. Furthermore, the method comprises generating, by the server, a first prompt instruction comprising the user query as well as the retrieved first set of factual information in the form of the set of paragraph output, the set of triplet output, and the set of graphs output, to feed to a generative language model to generate an intermediate rationale as explanation output. Moreover, each statement in the explanation output is linked to at least one fact reference from the first set of factual information as evidence. Furthermore, the method comprises performing, by the server, an automatic fact-checking operation to verify the explanation output against the retrieved first set of factual information and re-feeding by the server, the user query along with the generated explanation output to the generative language model to derive an answer output that is succinct in one or more language parameters as compared to the generated explanation output. Moreover, the answer output comprises a verified and evidence-supported answer and at least one fact reference from the first set of factual information.

The method solves major issues present in generative language models, including hallucination and complex factual reasoning. The method disclosed in the present disclosure allows an efficient, accurate, consistent, comprehensive, and factually consistent electronic processing of the user queries. The hybrid retrieval operation augments each query with factual information. The hybrid retrieval operation provides an optimized and effective retrieval of the factual information concurrently from the paragraph retrieval operation, the triplet retrieval operation, and the graph retrieval operation. Moreover, the retrieved factual information includes information at both granular-level information (e.g., paragraphs and triplets) and global-level knowledge (e.g., subgraphs) from the diverse data sources (i.e., large, and complex datasets) with different data types (e.g., text, graph, images, and the like). As a result, the overall processing time which is required to retrieve the factual information is reduced while factually consistently is maintained throughout the process.

Beneficially, the generation of the context information space is used to provide structured and organized factual information with accurate and comprehensive factual reasoning. Further, the factual information is used to generate the explanation output that acts as an evidence-based explanation of the retrieved factual information, thereby resolving the major issue of hallucination (i.e., false information generation). Furthermore, the auto fact-checking operation is used to verify the generated evidence-based explanations against retrieved factual information to ensure factual accuracy and reliability. Finally, the re-feeding of the user query with the generated explanation output to the generative language model for deriving an answer output that is succinct in one or more language parameters (e.g., less in length and improved clarity) is used to provide more reliable and precise answers.

In another aspect, the present disclosure provides a system for the electronic processing of user queries maintaining factual consistency during processing, the system includes a server configured to receive a user query from a client device, execute a hybrid retrieval operation comprising a paragraph retrieval operation, a triplet retrieval operation, and a graph retrieval operation, to retrieve a first set of factual information based on the user query from a plurality of diverse data sources and generate a context information space comprising a set of paragraph output from the paragraph retrieval operation, a set of triplet output from the triplet retrieval operation, and a set of graphs output from the graph retrieval operation. Furthermore, the server is configured to generate a first prompt instruction comprising the user query as well as the retrieved first set of factual information in the form of the set of paragraph output, the set of triplet output, and the set of graphs output, to feed to a generative language model to generate an intermediate rationale as an explanation output. Each statement in the explanation output is linked to at least one fact reference from the first set of factual information as evidence, perform an automatic fact-checking operation to verify the explanation output against the retrieved first set of factual information and re-feed the user query along with the generated explanation output to the generative language model to derive an answer output that is succinct in one or more language parameters as compared to the generated explanation output. Moreover, the answer output comprises a verified and evidence-supported answer and at least one fact reference from the first set of factual information.

The system achieves all the advantages and technical effects of the method of the present disclosure.

It has to be noted that all devices, elements, circuitry, units, and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity that performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features, and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not too scaled. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF THE DISCLOSURE

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1A:
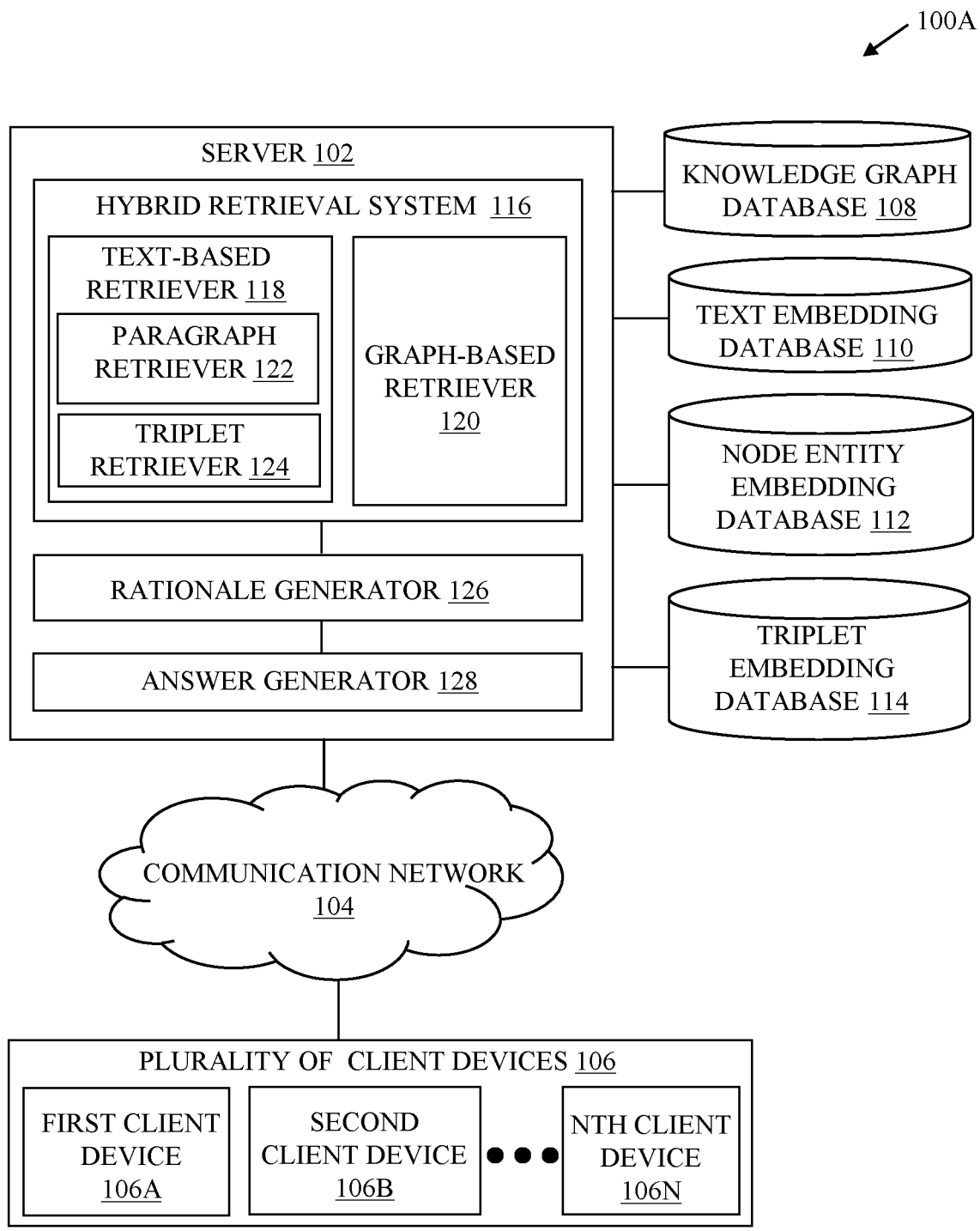
FIG. 1A is a block diagram of a system for electronic processing of user queries by maintaining factual consistency during processing, in accordance with an embodiment of the present disclosure.

FIG. 1A is a block diagram of a system for electronic processing of user queries by maintaining factual consistency during processing, in accordance with an embodiment of the present disclosure. With reference to FIG. 1, there is shown a block diagram of a system 100A. The system 100A includes a server 102, a communication network 104, and a plurality of client devices 106, such as a first client device 106A, a second client device 106B, to an Nth client device 106N. There is further shown that the system 100A includes a knowledge graph database 108, a text embedding database 110, a node entity embedding database 112, and a triplet embedding database 114 communicatively coupled with the server 102. The server 102 includes a hybrid retrieval system 116. The hybrid retrieval system 116 includes a text-based retriever 118 and a graph-based retriever 120.

The server 102 is configured to be used in the system 100A for the electronic processing of user queries maintaining factual consistency during processing. Examples of implementation of the server 102 may include but are not limited to, a blade server, a dedicated server, a storage server, a cloud-based server, a web server, an application server, or a combination thereof.

The communication network 104 includes a medium (e.g., a communication channel) through which the server 102, potentially communicates with the plurality of client devices 106. Examples of the communication network 104 may include but are not limited to, the Internet, a Local Area Network (LAN), a wireless personal area network (WPAN), a Wireless Local Area Network (WLAN), a wireless wide area network (WWAN), a cloud network, a Long-Term Evolution (LTE) network, a plain old telephone service (POTS), a Metropolitan Area Network (MAN), and/or the Internet.

Each of the plurality of client devices 106, such as the first client device 106A is configured to send a user query to the server 102. Examples of the plurality of client devices 106 may include but are not limited to, a mobile device, a smartphone, a desktop computer, a laptop computer, a Chromebook, a tablet computer, a robotic device, or other client devices. The server 102 may be communicatively coupled to the plurality of client devices 106, such as the first client device 106A, the second client device 106B, and the like via the communication network 104 and each of the plurality of client devices 106. The knowledge graph database 108, the text embedding database 110, the node entity embedding database 112, and the triplet embedding database 114 refer to a database that is accessible via the internet, typically through a web browser.

There is provided the system 100A for the electronic processing of user queries by maintaining factual consistency during processing. The system 100A is configured to provide a comprehensive solution that includes retrieval of the factual information from the plurality of diverse data sources, context generation, and automatic fact-checking to process the user queries while maintaining factual consistency for the generation of accurate, efficient, and reliable answers that are backed by factual evidence. The electronic processing of the user queries utilizes the reasoning abilities of large language models (LLM) to incorporate rationale as an explanation that acts as an evidence-based explanation for delivering concise, transparent, detailed, and factually accurate answers.

In operation, the server 102 is configured to receive a user query from a client device, such as one of the plurality of client devices 106. In an implementation, the server 102 is configured to receive concurrently hundreds to millions of user queries from the plurality of client devices 106. For example, the server 102 is configured to receive the user queries from the first client device 106A. Similarly, the server 102 is configured to receive the user queries from the second client device 106B. As a result, a plurality of users can send user queries, such as through the plurality of client devices 106 to the server 102 simultaneously.

Based on the received user query from the client device, the server 102 is configured to execute a hybrid retrieval operation that includes a paragraph retrieval operation, a triplet retrieval operation, and a graph retrieval operation, to retrieve a first set of factual information based on the user query from a plurality of diverse data sources. An example of the plurality of diverse data sources is further described in detail, for example, in FIG. 2B.

The hybrid retrieval operation corresponds to an operation that is executed by the server 102 to retrieve the first set of relevant information from the plurality of diverse data sources that includes comprehensive context (i.e., granular-level information and global-level knowledge) for a received user query. An example of the plurality of diverse data sources is further described in detail, for example, in FIG. 2B. Moreover, the plurality of diverse data sources may include, but is not limited to, a large and complex dataset of text strings, images, videos, graphs, and the like that are available in different formats and locations. In an implementation, the server 102 is configured to execute the hybrid retrieval operation to retrieve the first set of factual information based on the user query from the plurality of diverse data sources. In another implementation, a hybrid retrieval system 116 is configured to execute the hybrid retrieval operation to retrieve the first set of factual information based on the user query from the plurality of diverse data sources. Additionally, the server 102 is configured to eliminate duplicate and irrelevant information, such as by using a ReRanker algorithm.

In accordance with an embodiment, the paragraph retrieval operation and the triplet retrieval operation are text-based retrieving operations that involve finding relevant and factual information present in the plurality of diverse data sources, whereas the graph retrieval operation is based on a graph-based database created by extracting information pieces from the plurality of diverse data sources. An example of the paragraph retrieval operation, triplet retrieval operation, and a graph retrieval operation is further described in detail, for example, in FIGS. 2C, 2D, and 2E respectively. The hybrid retrieval system 116 includes a text-based retriever 118 and a graph-based retriever 120 that are specialized to perform different searches concurrently for different data types including semantic vectors, natural language text, knowledge graphs, and the like from the plurality of diverse data sources. For example, the text-based retriever 118 is configured to retrieve the textual data (i.e., paragraphs and triplets) from the plurality of diverse data sources, such as by executing the text-based retrieving operation. However, the text-based retriever 118 further includes a paragraph retriever 122 and a triplet retriever 124 that are configured to retrieve a set of relevant triplets and a set of relevant paragraphs, respectively. Similarly, the graph-based retriever 120 is configured to retrieve the graphical data (i.e., subgraphs) from the plurality of diverse data sources, such as by executing the graph-based retrieving operation. Moreover, the relevant and factual information is retrieved from the plurality of diverse data sources that are pre-processed and stored in the related databases, such as the knowledge graph database 108, the text embedding database 110, the node entity embedding database 112, and the triplet embedding database 114 as further shown and described in detail in FIG. 2B. Therefore, the paragraph retrieval operation, the triplet retrieval operation, and the graph retrieval operation enable the system 100A to gather comprehensive, diverse, relevant, and factual information that is related to the user query received by the client device from the plurality of client devices 106 with reduced processing time.

In accordance with an embodiment, the paragraph retrieval operation includes concurrently performing semantic encoding and lexical encoding of the user query for searching and extracting a set of paragraphs from a semantic chunk and a textual chunk of a paragraphs embedding database. In other words, the paragraph retriever 122 of the text-based retriever 118 is used to execute the paragraph retrieval operation that is used for retrieving the relevant and factual paragraphs. Moreover, the paragraph retriever 122 is configured to concurrently perform semantic encoding (i.e., for semantic search) and lexical encoding (i.e., for lexical search) of the user query for searching and extracting the set of paragraphs from a semantic chunk and a textual chunk of the paragraphs embedding database, such as the text embedding database 110. Moreover, the semantic chunk of the paragraphs embedding database (i.e., the text embedding database 110) refers to a contiguous group of words that forms a meaningful unit within a sentence and the textual chunk refers to the text stored in the text embedding database 110. In an implementation, the semantic encoding of the user query is performed for searching and extracting a set of paragraphs from the semantic chunk of the paragraphs embedding database, such as the text embedding database 110. In such implementation, the paragraph retriever 122 is configured to obtain embeddings of the user query, such as by using an encoder-only language model, such as bidirectional encoder representations from transformers (BERT), and the like without affecting the scope of the present disclosure. Thereafter, the paragraph retriever 122 is configured to perform a semantic vector search over the text embedding database 110 that includes semantic vectors of all the paragraphs to retrieve the set of paragraphs (i.e., Top-k relevant paragraphs). In another implementation, the lexical encoding of the user query is performed for searching and extracting a set of paragraphs from the textual chunk of a paragraphs embedding database, such as the text embedding database 110. In such implementation, the paragraph retriever 122 is configured to perform a textual search, such as by using a phrase search, an n-gram search, a keyword search, and the like without affecting the scope of the present disclosure, over the text embedding database 110 that includes a natural language text. As a result, the paragraph retrieval operation enables the system 100A to search and extract the relevant and factual set of paragraphs that matches the requirements of the received user query.

In accordance with an embodiment, the paragraph retrieval operation further includes re-ranking the extracted set of paragraphs to obtain a re-ordered set of paragraphs that corresponds to the set of paragraph output from the paragraph retrieval operation. The re-ranking of the extracted set of paragraphs refers to an arrangement of the extracted set of paragraphs based on the relevancy of the extracted set of paragraphs with the user query. Firstly, the system 100A is configured to extract the relevant set of paragraphs from the plurality of diverse data sources. In addition, the system 100A is configured to eliminate the duplicate paragraph from the set of extracted paragraphs and provide a relevancy score for each retrieved paragraph, such as by using a ReRanker algorithm. Furthermore, the server 102 is configured to assign ranks to each of the extracted set of paragraphs based on the relevancy score. For example, the server 102 is configured to assign the highest rank to the most relevant paragraph and the lowest rank to the least relevant paragraph. As a result, the system 100A is configured to re-order the extracted paragraphs to provide the most pertinent paragraphs (i.e., TOP-P paragraphs) as requested by a user through the client device.

In accordance with an embodiment, the triplet retrieval operation includes concurrently performing semantic encoding and lexical encoding of the user query and searching and extracting a set of triplets from a text embedding database based on the semantic encoding and the lexical encoding. In other words, the triplet retriever 124 of the text-based retriever 118 is used to execute the triplet retrieval operation that is used for retrieving the set of triplets. Each triplet from the set of triplets refers to a triplet that includes a subject, a relation, and an object. (i.e., a head, a relation, and a tail). Moreover, the triplet retriever 124 is configured to concurrently perform semantic encoding (i.e., for semantic search) and lexical encoding (i.e., for lexical search) of the user query for searching and extracting the set of triplets from the text embedding database 110. In an implementation, the semantic encoding of the user query is performed for searching and extracting a set of triplets. In such implementation, the triplet retriever 124 is configured to obtain embeddings of the user query, such as by using an encoder-only language model, such as bidirectional encoder representations from transformers (BERT) and the like without affecting the scope of the present disclosure. Thereafter, the triplet retriever 124 is configured to perform a semantic vector search over the text embedding database 110 that includes semantic vectors of all the triplets to retrieve the set of triplets (i.e., Top-k relevant triplets). In another implementation, the lexical encoding of the user query is performed for searching and extracting a set of triplets from the triplet embedding database 114. In such implementation, the triplet retriever 124 is configured to perform a textual search, such as by using a phrase search, a n-gram search, a keyword search, and the like without affecting the scope of the present disclosure, over the text embedding database 110. As a result, the triplet retrieval operation enables the system 100A to search and extract the relevant set of triplets that indicates the subject as well the relation of the subject with the object that matches the requirements of the received user query.

In accordance with an embodiment, the triplet retrieval operation further comprises re-ranking the extracted set of triplets to obtain a re-ordered set of triplets that corresponds to the set of triplet output from the triplet retrieval operation. The re-ranking of the extracted set of triplets refers to an arrangement of the extracted set of triplets based on the relevancy of the extracted set of triplets with the user query. Firstly, the system 100A is configured to extract the relevant set of triplets from the plurality of diverse data sources. In addition, the system 100A is configured to eliminate the duplicate triplets from the set of extracted triplets and provide a relevancy score for each retrieved triplet, such as by using a ReRanker algorithm. Furthermore, the server 102 is configured to assign ranks to each of the extracted set of triplets based on the relevancy score. For example, the server 102 is configured to assign the highest rank to the most relevant triplet and the lowest rank to the least relevant triplet. As a result, the system 100A is configured to re-order the extracted triplet to provide the most pertinent triplets (i.e., a TOP-P triplet) as requested by the user through the client device.

In accordance with an embodiment, the graph retrieval operation includes extracting a plurality of query entities from the user query, searching the plurality of query entities in a node entity embedding database to retrieve one or more topic node entities, and retrieving a set of sub-graphs from a knowledge graph database based on the one or more topic node entities and the user query. In other words, the graph-based retriever 120 is configured to extract key entity nodes from the node entity embedding database 112 and the set of sub-graphs from the knowledge graph database 108, such as by using semantic methods. In an implementation, a topic entity extractor (i.e., a traditional named entity recognition (NER) language model) is configured to extract the key entities present in the user query. However, if the entity is not extracted as a node in the knowledge graph database 108, then, in that case, the entity extractor is configured to perform a semantic and a keyword search over all the node entities to extract any similar node entity. In another implementation, a subgraph retriever is configured to traverse an initial node to all node entities and extract relevant paths for the received user query from the knowledge graph database 108, such as by using a subgraph retrieval algorithm to extract the set of sub-graphs (or granular-level information) from each of the traversed paths. Moreover, the graph retrieval operation is performed to traverse in both directions (i.e., a forward direction and a backward direction), such as through the server 102. For example, the server 102 is configured to traverse from the head of the node entity to the tail of the node entity of the subgraph. Alternately, the server 102 is configured to traverse from the tail of the node entity to the head of the node entity to the subgraph. As a result, a large complex data stored in the form of head-relation-tail can be retrieved without converting the data into textual format.

In accordance with an embodiment, the graph retrieval operation further comprises re-ranking the retrieved set of sub-graphs to obtain a re-ordered set of sub-graphs that corresponds to the set of graphs output from the graph retrieval operation. The re-ranking of the extracted set of sub-graphs refers to an arrangement of the extracted set of sub-graphs based on the relevancy of the extracted set of sub-graphs with the user query. Firstly, the system 100A is configured to extract the relevant set of sub-graphs from the plurality of diverse data sources. In addition, the system 100A is configured to eliminate the duplicate sub-graphs from the set of extracted sub-graphs and provide a relevancy score for each retrieved sub-graph, such as by using a ReRanker algorithm. Furthermore, the server 102 is configured to assign ranks to each of the extracted set of sub-graphs based on the relevancy score. For example, the server 102 is configured to assign the highest rank to the most relevant sub-graphs and the lowest rank to the least relevant sub-graphs. As a result, the system 100A is configured to re-order the extracted sub-graphs to provide the most pertinent sub-graphs (i.e., TOP-P sub-graphs) as requested by a user through the client device.

Furthermore, the server 102 is configured to generate a context information space including the set of paragraph output from the paragraph retrieval operation, the set of triplet output from the triplet retrieval operation, and the set of graphs output from the graph retrieval operation. In an implementation, the context information space includes the set of paragraph output retrieved from the paragraph retrieval operation. In another implementation, the context information space includes the set of triplet output retrieved from the triplet retrieval operation. In yet another implementation, the context information space includes the set of graph output retrieved from the graph retrieval operation. An example of the context information space is further described in detail, for example, in FIG. 2F. Therefore, by generating the context information space is used to store the retrieved first set of information that includes the set of paragraphs output, the set of triplets output, and the set of graph output is used to store for further processing.

Furthermore, the server 102 is configured to generate a first prompt instruction including the user query as well as the retrieved first set of factual information in the form of the set of paragraph output, the set of triplet output, and the set of graphs output, to feed to a generative language model to generate an intermediate rationale as explanation output. In other words, a rationale generator 126 is configured to convert the user query and the retrieved first set of factual information that includes the set of paragraph output, the set of triplet output, and the set of graph output to generate the first prompt instruction, as further shown and explained in detail in FIG. 2F. After the generation of the first prompt instruction, the rationale generator 126 is configured to feed the generated first prompt instruction to the generative language model. In an implementation, the generative language model is trained to identify the relevant and factual information and further generate the transparent and evidence-based explanation output. The intermediate rationale as an explanation output refers to a text summary or explanation that includes detailed and factual information as per the request of the user based on the set of evidence. Moreover, each statement in the explanation output is linked to at least one fact reference from the first set of factual information as evidence. As a result, the generation of the intermediate rationale as explanation output enables the system 100A to enhance the trustworthiness and comprehensibility of the retrieved first set of factual information and eliminates the generation of inaccurate or false information by generative language models (i.e., hallucination).

In accordance with an embodiment, the server 102 is further configured to assign a fact identifier to each statement in the explanation output. Moreover, the fact identifier points to a fact taken from one of the set of paragraph output, the set of triplet output, and the set of graphs output, to generate each statement in the explanation output. The fact identifier is assigned to indicate which specific fact from the set of paragraph output, the set of triplet output, or the set of graph output is associated with each statement of the explanation output. As a result, the fact identifier allows the server 102 to identify the fact taken from the one of the set of paragraph output, the set of triplet output, and the set of graphs output that acts as a reference for the generation of each of the statement in the explanation output. In an implementation, the fact identifier is one of a unique paragraph identifier pointing to one paragraph of the set of paragraph output, a unique triplet identifier pointing to the set of triplet output, and a unique graph identifier pointing to the set of graphs output. In an example, the fact identifier is the unique paragraph identifier pointing to one paragraph of the set of paragraph output. In another example, the fact identifier is the unique triplet identifier pointing to the set of triplet output. In yet another example, the fact identifier is the unique graph identifier pointing to the set of graphs output. Advantageously, each of the fact identifiers acts as an indicator that indicates the factual reasoning behind each of the generated statements of the explanation output based on the retrieved factual information.

Furthermore, the server 102 is configured to perform an automatic fact-checking operation to verify the explanation output against the retrieved first set of factual information. In other words, an auto-fact checker is configured to utilize the large language model (LLM) and the first prompt instruction to perform the automatic fact-checking operation to verify the explanation output against the retrieved first set of factual information. Furthermore, the auto-fact checker assigns a category to each point in the explanation output that indicates if the generated explanation output is factually correct or incorrect. The detailed explanation of the automatic fact-checking operation is shown and explained in detail in FIG. 3E. Hence, the system 100A is configured to maintain overall the factual integrity of the explanation output by ensuring the overall accuracy and reliability of generated answer output.

Furthermore, the server 102 is configured to re-feed the user query along with the generated explanation output to the generative language model to derive an answer output that is succinct in one or more language parameters as compared to the generated explanation output. In other words, an answer generator 128 is configured to convert the user query along with the generated explanation output to the second prompt instruction that is further used to derive a concise and factually accurate answer output that is succinct in one or more language parameters as compared to the generated explanation output. The one or more language parameters include a length parameter, an apposite parameter, and a lucid parameter of the answer output. For example, the generated answer output is much more succinct one or more succinct in length while more apposite and lucid as compared to the generated explanation output. Moreover, the answer output includes a verified and evidence-supported answer and at least one fact reference from the first set of factual information. As a result, the generated answer output resolves the major issue of hallucination (i.e., wrong, or false information generation) by providing the answer output with accurate and reliable factual reasoning.

In accordance with an embodiment, the server 102 is further configured to restrict the answer output based on the generated explanation output. In an implementation, the server 102 is configured to generate the answer output based on the generated explanation output. In another implementation, the server 102 is configured not to generate any answer output if the explanation output is not generated. As a result, the server 102 is configured to ensure that the generated answer output is aligned with the generated explanation that is backed by reliable and accurate evidence. Hence, the server 102 is configured to generate the answer output based on the generated explanation output leading to more accurate, reliable, and comprehensive responses that eliminate the possibility of hallucination.

In an implementation, the server 102 is configured to generate the second prompt instruction including the user query as well as the generated explanation output for the re-feeding of the generative language model to generate the answer output. The second prompt instruction includes the user query and the generated explanation output that is used to generate the answer output, such as by re-feeding the second prompt instruction to the generative language model. As a result, the answer output with improved reliability and credibility is generated. Hence, the generation of the comprehensive and relevant answer output can be further used to support a variety of real-time applications, such as question-answering, information retrieval, and knowledge recovery.

In an implementation, the server 102 is configured to perform an automatic grading of the answer output and the automatic grading involves evaluating the answer output against the generated explanation output. In other words, an auto-grader mechanism is used to evaluate the accuracy of the generated answer output, such as by scoring the reasoning process of the system. The server 102 is configured to assign a score based on the generated explanation output, the generated answer output, and the user query as input. Further, the server 102 is configured to provide a verdict based on the assigned score that is used to depict the quality of the generated answer output and the explanation output. However, if the second prompt instruction changes, then, in that case, the server 102 is configured to assign the score accordingly based on the changed second prompt instruction. As a result, the automatic grading of the answer output enables the system 100A to ensure the quality of the answer output with enhanced reliability, and explanation by maintaining the overall factual consistency throughout the processing.

The system 100A allows an efficient, accurate, consistent, comprehensive, and factually consistent electronic processing of the user queries. The hybrid retrieval operation provides an optimized and effective retrieval of the factual information concurrently. Moreover, the retrieved factual information includes information at both granular-level information (e.g., paragraphs and triplets) and global-level knowledge (e.g., subgraphs) from the diverse data sources (i.e., large, and complex datasets) with different data types (e.g., text, graph, images, and the like). As a result, the overall processing time which is required to retrieve the factual information is reduced.

The generation of the context information space is used to provide structured and organized factual information with accurate and comprehensive factual reasoning. Further, the factual information is used to generate the intermediate rationale as an explanation output that acts as an evidence-based explanation of the retrieved factual information, thereby resolving the major issue of hallucination (i.e., false information generation). Furthermore, the auto fact-checking operation is used to verify the generated evidence-based explanations against retrieved factual information to ensure factual accuracy and reliability. Finally, the re-feeding of the user query with the generated explanation output to the generative language model for deriving an answer output that is succinct in one or more language parameters is used to provide more reliable and precise answers.

Figure 1B:
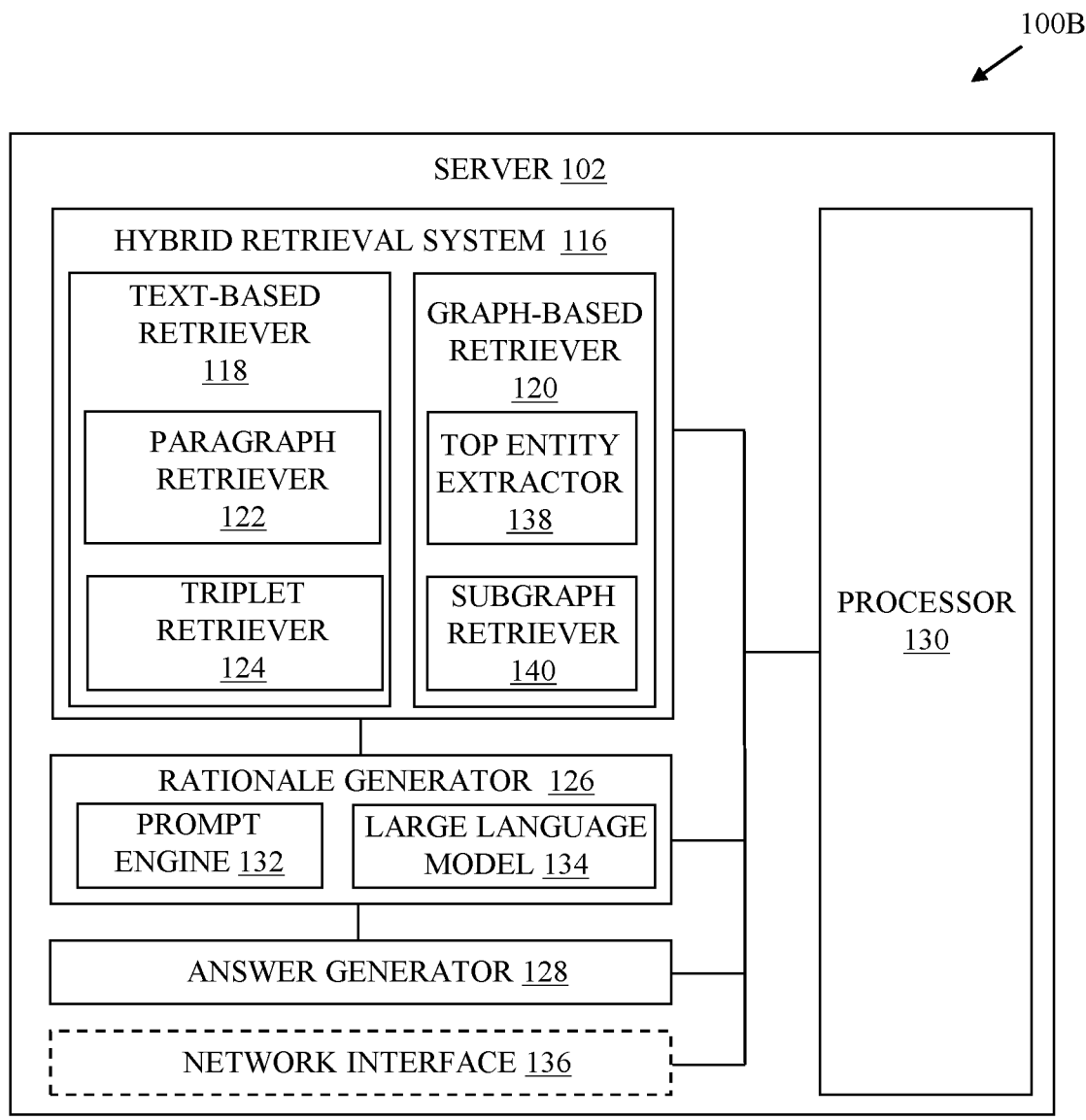
FIG. 1B is a block diagram of another system for electronic processing of user queries maintaining factual consistency during processing, in accordance with an embodiment of the present disclosure.

FIG. 1B is a block diagram of another system for electronic processing of user queries maintaining factual consistency during processing, in accordance with an embodiment of the present disclosure. FIG. 1B is described in conjunction with elements from FIG. 1A. With reference to FIG. 1B, there is shown a block diagram of a system 100B that includes the server 102, a processor 130, the hybrid retrieval system 116, top entity extractor 138, subgraph retriever 140, and a network interface 136.

The processor 130 is configured to electronically process the user queries by maintaining factual consistency during the processing. Examples of the processor 130 may include, but are not limited to, a microcontroller, a microprocessor, a central processing unit (CPU), a complex instruction set computing (CISC) processor, a controller, an application-specific integrated circuit (ASIC) processor, a reduced instruction set (RISC) processor, a very long instruction word (VLIW) processor, a data processing unit, and other processors or control circuitry.

The network interface 136 refers to a communication interface to enable communication of the server 102 to any other external device, such as the plurality of client devices 106. Examples of the network interface 136 include but are not limited to, a network interface card, a transceiver, and the like.

In an implementation scenario, the processor 130 of the server 102 is configured to receive the user query from the client device. Furthermore, the processor 130 is configured to execute the hybrid retrieval operation comprising a paragraph retrieval operation, the triplet retrieval operation, and the graph retrieval operation, to retrieve the first set of factual information based on the user query from a plurality of diverse data sources. In an implementation, a top entity extractor 138 (i.e., a traditional named entity recognition (NER) language model) is configured to extract the key entities from the node entity embedding database 112. However, if the entity is not extracted as a node in the knowledge graph database 108, the, in that case, the top entity extractor 138 is configured to perform a semantic and keyword search over all the node entities to extract any similar node entity. In another implementation, a subgraph retriever 140 is configured to traverse an initial node to all node entities and extract relevant paths for the received user query from the knowledge graph database 108, such as by using a subgraph retrieval algorithm to extract the set of sub-graphs (or granular-level information) from each of the traversed paths. Moreover, the graph retrieval operation is performed to traverse in both directions (i.e., a forward direction and a backward direction), such as through the server 102.

Furthermore, the processor 130 is configured to generate the context information space comprising the set of paragraph output from the paragraph retrieval operation, the set of triplet output from the triplet retrieval operation, and the set of graphs output from the graph retrieval operation. Thereafter, the processor 130 is configured to generate a first prompt instruction comprising the user query as well as the retrieved first set of factual information in the form of the set of paragraph output, the set of triplet output, and the set of graphs output, to feed to a generative language model to generate an intermediate rationale as explanation output. In other words, the rationale generator 126 includes a prompt engine 132 and a large language model (LLM) 134 that are capable of providing the factual reasoning. The prompt engine 132 is configured to retrieve the first set of factual information and convert the corresponding set of factual information into a first prompt instruction that serves as an input to the LLM 134. As a result, the LLM 134 is configured to collect the first set of factual information effectively, reliably, and accurately including both implicit and explicit reasoning with transparent and evidence-based rationale. In addition, the system 100B is configured to handle large-scale databases and performs complex-reasoning tasks, and utilizes triplet data as an input (head-relation-tail) without converting it to free-text (NLP text). Moreover, each statement in the explanation output is linked to at least one fact reference from the first set of factual information as evidence, and the processor 130 is configured to perform an automatic fact-checking operation to verify the explanation output against the retrieved first set of factual information and re-feed the user query along with the generated explanation output to the generative language model to derive an answer output that is succinct in one or more language parameters as compared to the generated explanation output. In an implementation, the prompt engine 132 is configured to generate the second prompt instruction that is utilized by the LLM 134 for the generation of the final concise answer. Therefore, the processor 130 is configured to generate the factually accurate answer output with credible and reliable reasoning and simplification. Moreover, the answer output includes a verified and evidence-supported answer and at least one fact reference from the first set of factual information. Hence, the system 100B is configured to provide a comprehensive solution that combines retrieval techniques, context organization, generative language modeling, and automatic fact-checking to process user queries while maintaining factual consistency to provide accurate and well-supported answers outputs to user queries based on diverse factual information.

Figure 2A:
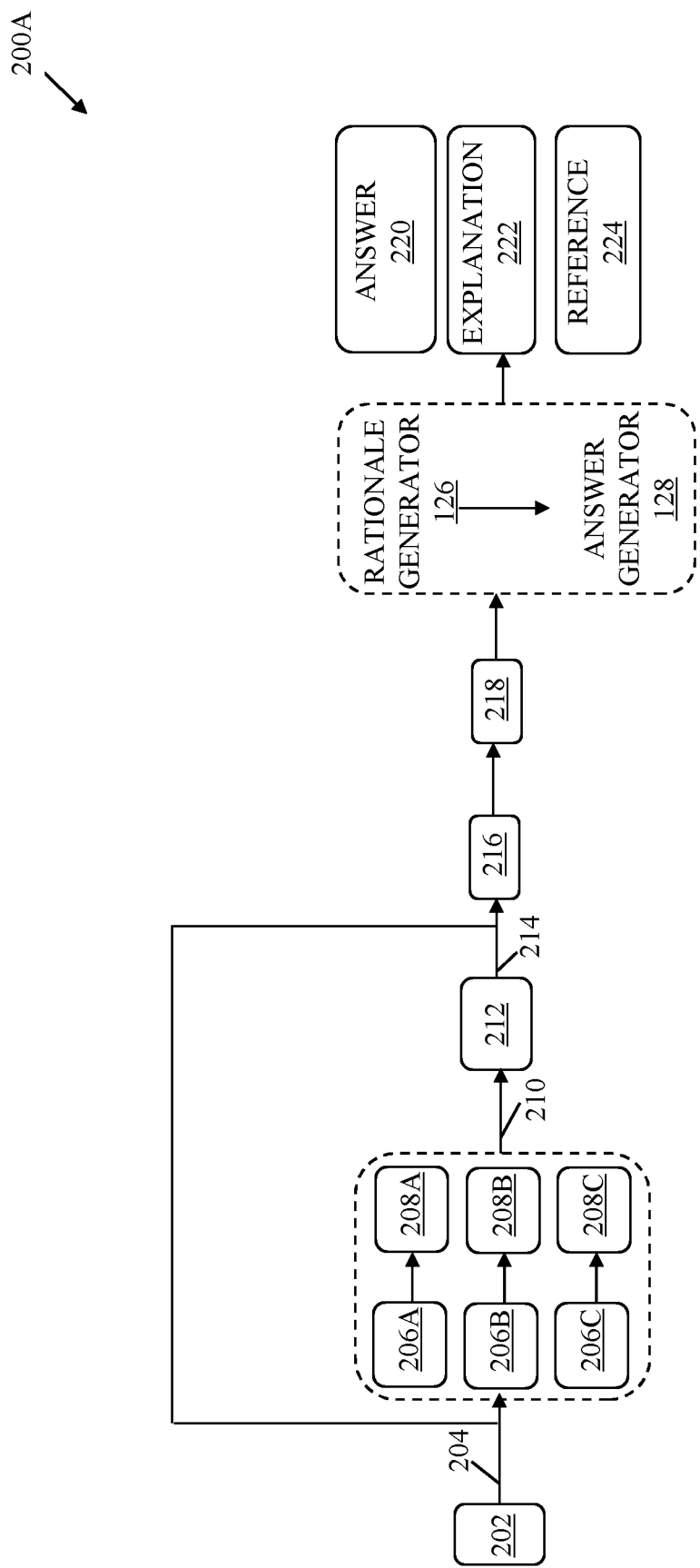
FIG. 2A is a diagram that depicts an exemplary scenario of electronic processing of a user query by maintaining factual consistency during processing, in accordance with an embodiment of the present disclosure.

FIG. 2A is a diagram that depicts an exemplary scenario of electronic processing of a user query by maintaining factual consistency during processing, in accordance with an embodiment of the present disclosure. FIG. 2A is described in conjunction with elements from FIGS. 1A and 1B. With reference to FIG. 2A, there is shown a user query 202 that is electronically processed by maintaining the factual consistency during the processing.

In an exemplary scenario, the user query 202 is received by the hybrid retrieval system 116, such as at operation 204. The hybrid retrieval system 116 is configured to execute the hybrid retrieval operation that includes a paragraph retrieval operation 206A, a triplet retrieval operation 206B, and a graph retrieval operation 206C, to retrieve a first set of factual information based on the user query 202 from a plurality of diverse data sources. In an implementation, the paragraph retrieval operation 206A is executed to obtain a set of paragraph output 208A. In another implementation, the triplet retrieval operation 206B is executed to obtain a set of triplet output 208B. In yet another implementation, the graph retrieval operation 206C is executed to obtain a set of graph output 208C. Furthermore, the first set of factual information includes the set of paragraph output 208A, the set of triplet output 208B, and the set of graph output 208C. Thereafter, at operation 210, a context information space 212 is generated. Moreover, the context information space 212 includes the set of paragraph output 208A from the paragraph retrieval operation 206A, the set of triplet output 208B from the triplet retrieval operation 206B, and the set of graph output 208C from the graph retrieval operation 206C. Thereafter, at operation 214, a prompt engine 216 is configured to generate a first prompt instruction 218A including the user query 202 as well as the retrieved first set of factual information 208 in the form of the set of paragraph output 208A, the set of triplet output 208B, and the set of graph output 208C, to feed to the generative language model to generate the intermediate rationale as the explanation output. In other words, the rationale generator 126 is configured to generate the intermediate rationale as the explanation output, and each statement in the explanation output is linked to at least one fact reference from the first set of factual information as evidence. Moreover, a second prompt instruction including the user query 202 as well as the generated explanation output, for the re-feeding of the generative language model to generate the answer output, such as through the prompt engine 216. Furthermore, the answer generator 128 is configured to re-feed the user query 202 along with the generated explanation output to the generative language model to derive an answer output that is succinct in one or more language parameters as compared to the generated explanation output and the answer output includes a verified and evidence-supported answer output 220 and at least one fact reference 224 from the first set of factual information along with a valid explanation 222.

Figure 2B:
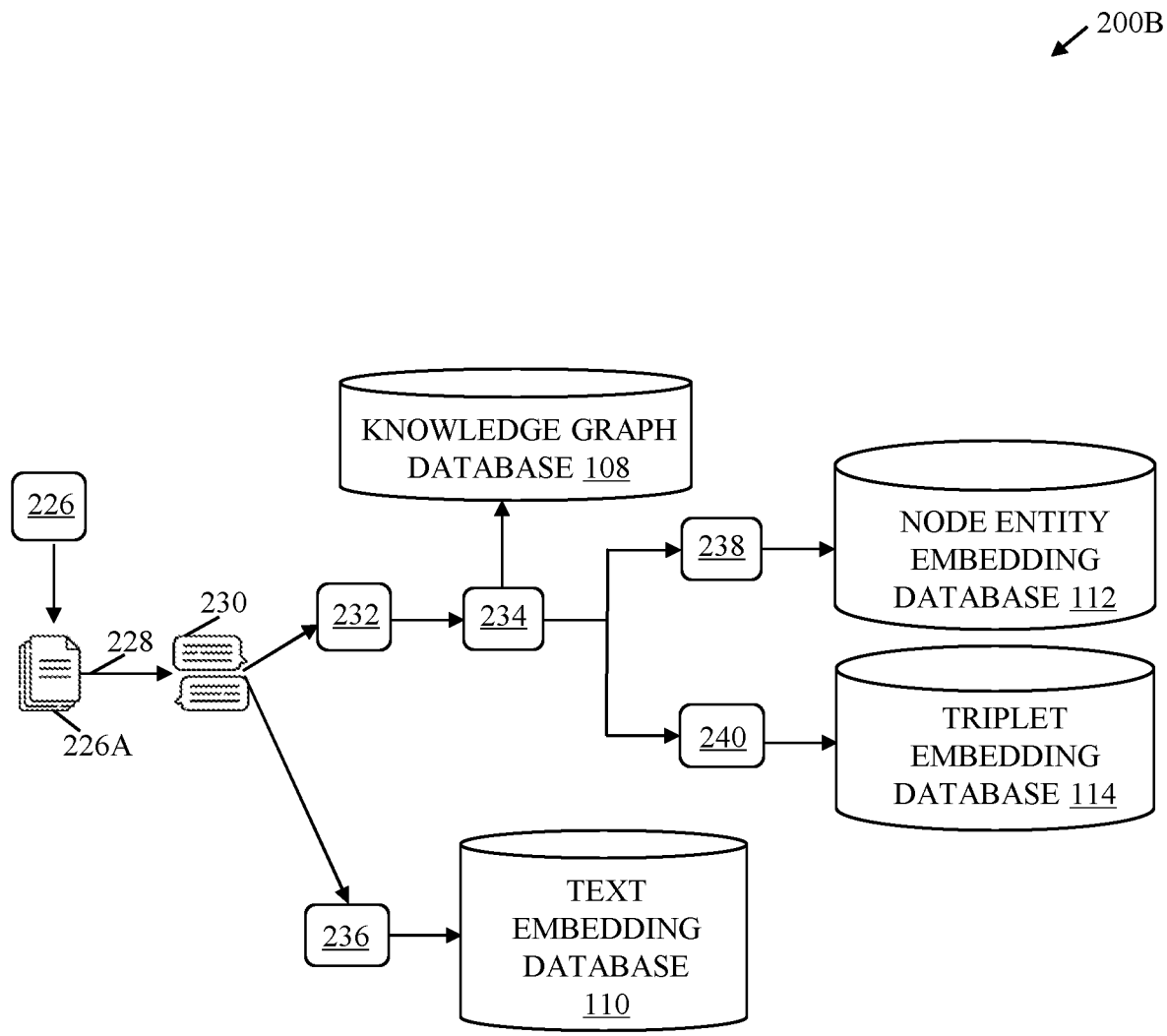
FIG. 2B is a diagram that depicts a pre-processing stage of a plurality of diverse data sources, in accordance with an embodiment of the present disclosure.

FIG. 2B is a diagram that depicts a pre-processing stage of a plurality of diverse data sources, in accordance with an embodiment of the present disclosure. FIG. 2B is described in conjunction with elements from FIGS. 1A, 1B, and 2A.

In an exemplary scenario, the pre-processing stage includes acquiring a dataset of documents 226A from the plurality of diverse data sources 226. In an implementation, the dataset of documents can be collected from various sources, such as websites, databases, or any other such sources. At operation 228, the server 102 is configured to extract and split the dataset of documents 226A into paragraphs of text or chunks 230. Furthermore, the server 102 is configured to execute a triplet extraction operation 232 and thereafter perform knowledge graph construction operation 234 to create the knowledge graph database 108. Alternatively, at operation 236, the server 102 is configured to perform a semantic encoding of the extracted paragraphs of text or chunks 230 to create the text embedding database 110. Furthermore, the server 102 is configured to create the node entity embedding database 112, such as by executing the semantic encoding (i.e., at operation 238) and the triplet embedding database 114 (i.e., at operation 240) from the acquired dataset of documents 226A based on a plurality of document processing operations, such as the triplet extraction operation, the knowledge graph construction operation, the semantic encoding operation, and the like. In an implementation, the knowledge graph database 108 stores information about the entities and relationships in the knowledge graph. In another implementation, the text embedding database 110 stores embeddings of text documents. In yet another implementation, the node entity embedding database 112 stores embeddings of the nodes in the knowledge graph. In another implementation, the triplet embedding database 114 stores embeddings of triplets of entities and relationships.

In accordance with an embodiment, the pre-processing stage further includes indexing, caching, and creating parallel processing pathways for retrieval of information from the created knowledge graph database 108, the text embedding database 110, the node entity embedding database 112, and the triplet embedding database 114. The indexing of the pre-processing stage refers to the creation of a searchable index and caching refers to the storing of frequently accessed information in a memory. Moreover, the creation of parallel processing pathways allows the execution of multiple user queries concurrently. As a result, the server 102 is enabled to retrieve the data with reduced overall processing time.

Figure 2C:
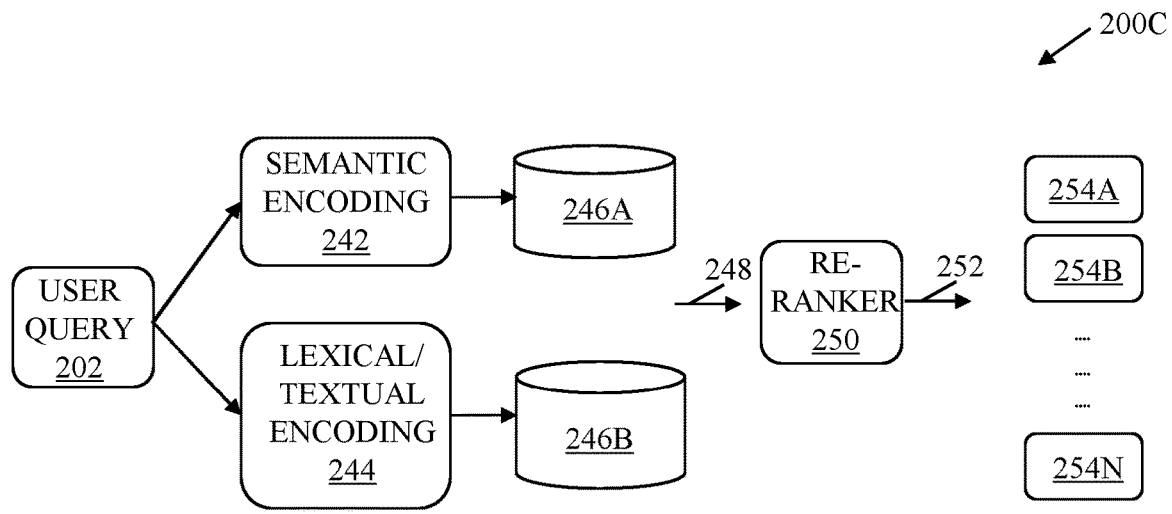
FIG. 2C is a diagram that depicts a paragraph retrieval operation, in accordance with an embodiment of the present disclosure.

FIG. 2C is a diagram that depicts a paragraph retrieval operation, in accordance with an embodiment of the present disclosure. FIG. 2C is described in conjunction with elements from FIGS. 1A, 1B, 2A and 2B. With reference to FIG. 2C there is shown a paragraph retrieval operation.

In an exemplary scenario, the paragraph retrieval operation is executed by the paragraph retriever 122. The paragraph retriever 122 is configured to retrieve relevant paragraphs using two retrievers, such as by using a semantic search retriever and a lexical Search retriever concurrently. The paragraph retriever 122 is configured to execute a semantic encoding 242 that includes obtaining embeddings of the user query 202 using an encoder-only language model, such as BERT, and further performs a semantic vector search over a semantic chunk/paragraph embedding storage 246A that includes semantic vectors of all the paragraphs to retrieve Top-k relevant paragraphs. Alternatively, the paragraph retriever 122 is configured to execute a lexical/textual encoding 244 to search a vector database that is referred to as a textual chunk/paragraph embedding storage 246B, such as by using phrase, n-gram, and Keyword search over a database containing natural language text. Furthermore, at operation 248, the server 102 is configured to execute a ReRanker algorithm 250 to re-rank the retrieved paragraphs based on the relevancy score for each retrieved paragraph. In addition, the server 102 is configured to remove the duplicate paragraphs and keeps only the top-P paragraphs. Finally, at operation 252, a set of paragraphs, such as a first paragraph 254A, a second paragraph 254B, and a nth paragraph 254N are retrieved. As a result, the relevant and factually consistent set of paragraph output is retrieved with enhanced accuracy and reliability.

Figure 2D:
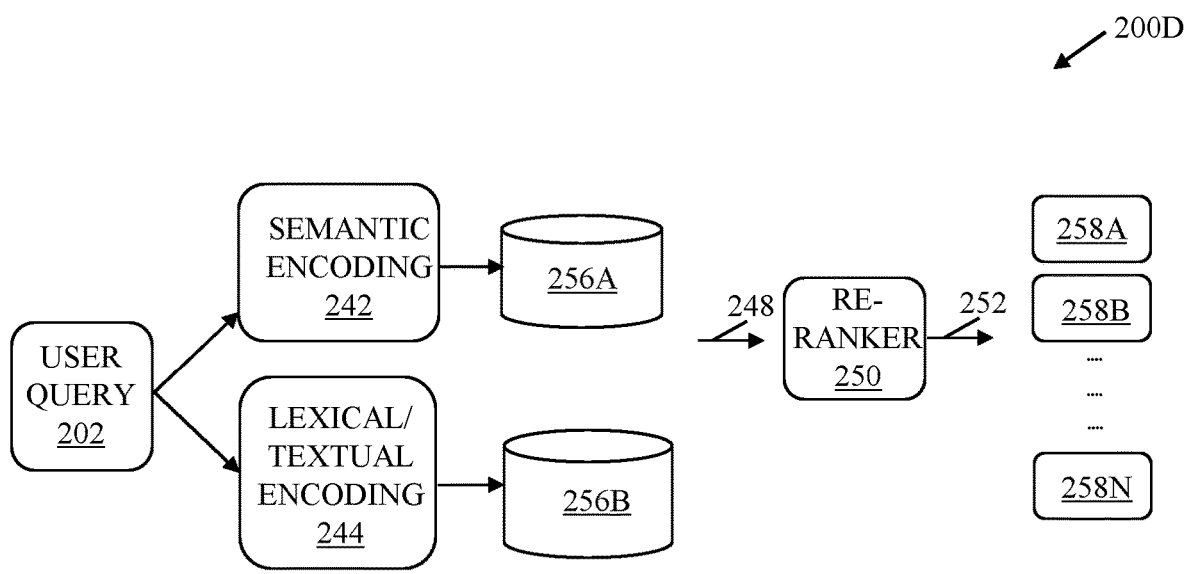
FIG. 2D is a diagram that depicts a triplet retrieval operation, in accordance with an embodiment of the present disclosure.

FIG. 2D is a diagram that depicts a triplet retrieval operation, in accordance with an embodiment of the present disclosure. FIG. 2D is described in conjunction with elements from FIGS. 1A, 1B, 2A, 2B, and 2C. With reference to FIG. 2C there is shown the triplet retrieval operation.

In an implementation scenario, the triplet retrieval operation is executed by the triplet retriever 124, which is configured to retrieve relevant triplets using two retrievers, such as by using a semantic search retriever and a lexical Search retriever concurrently. At operation 242, the triplet retriever 124 is configured to concurrently perform the semantic encoding 242 and lexical encoding 246 of the user query 202. Furthermore, the triplet retriever 124 is configured to search and extract a set of triplets from a text embedding database 256A and another text embedding database 256B based on the semantic encoding and the lexical encoding. Furthermore, at operation 248, the server 102 is configured to execute a ReRanker algorithm 250 to re-rank the retrieved triplets based on the relevancy score for each retrieved triplet. In addition, the server 102 is configured to remove the duplicate triplets and keeps only the top-P triplets. Finally, at operation 252, a set of triplets, such as a first triplet 258A, a second triplet 258B, and a nth triplet 258N are retrieved. As a result, the relevant and factually consistent set of triplet output is retrieved with enhanced accuracy and reliability.

Figure 2E:
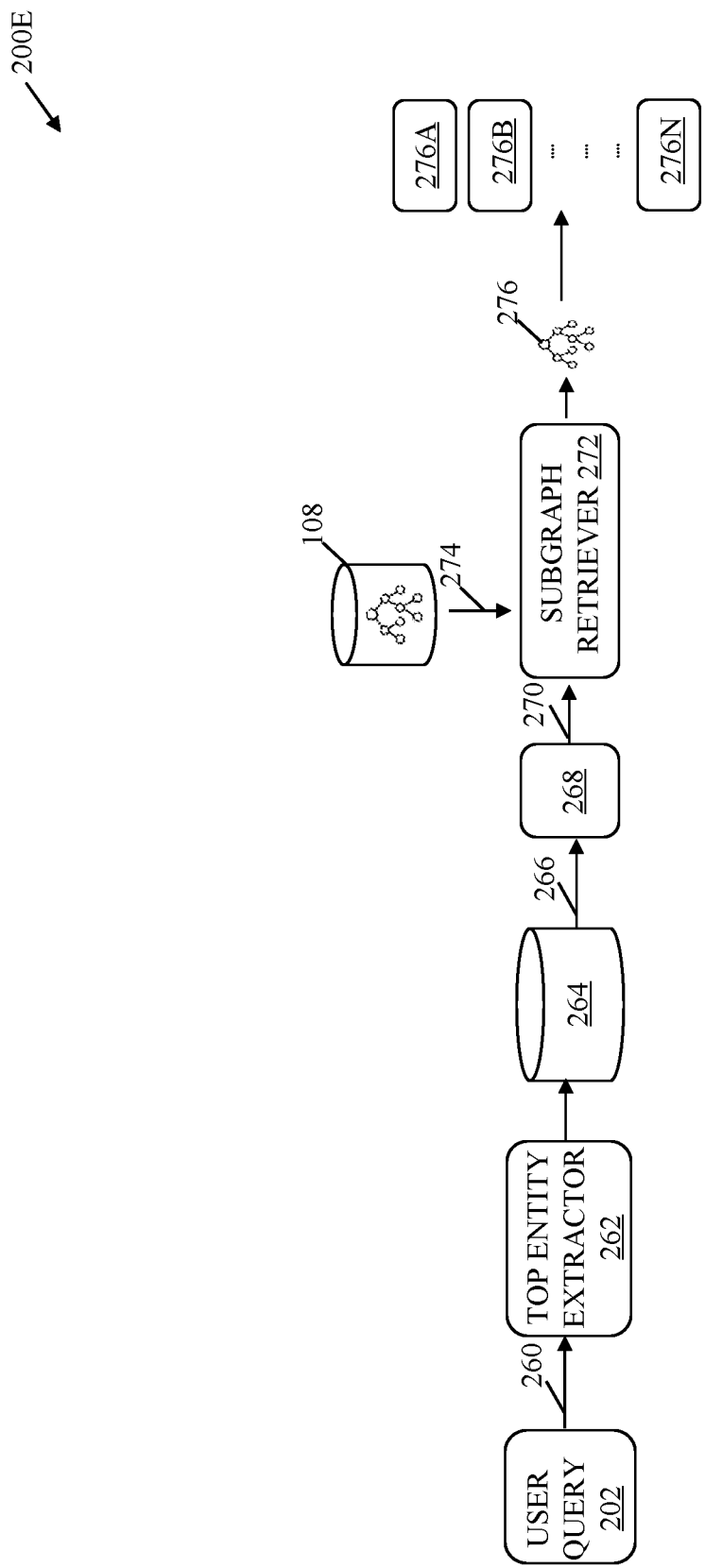
FIG. 2E is a diagram that depicts a graph retrieval operation, in accordance with an embodiment of the present disclosure.

FIG. 2E is a diagram that depicts a graph retrieval operation, in accordance with an embodiment of the present disclosure. FIG. 2D is described in conjunction with elements from FIGS. 1A, 1B, 2A, 2B, 2C, and 2D. With reference to FIG. 2E there is shown the graph retrieval operation.

In an implementation scenario, a graph-based retriever 120 is configured to extract the key entity nodes and a subgraph from the knowledge graph database 108, such as by using the graph retrieval operation. At operation 260, a top entity extractor 262 (or a traditional NER, Language model) is configured to extract key entities from the received user query 202. However, if any entity is not present as a node in the knowledge-based graph, then, in that case, the top entity extractor 262 is configured to perform semantic and keyword searches over all the node entities in a node entity vector database 264 to identify and extract any similar node entity, such as at operation 266. Thereafter, at operation 268, the top k-node entities similar to each of the extracted nodes are retrieved. Furthermore, at operation 270, a subgraph retriever 272 is configured to use top K node entities as an initial node and execute the subgraph retrieval algorithm, such as by traversing and extracting the relevant paths for the received user query 202 from the knowledge graph database 108, such as at operation 274. Thereafter, the subgraph retriever 272 is configured to extract granular-level information from each path as well as a subgraph, such as subgraph 276. Finally, the factually accurate and relevant set of subgraph output, such as a first subgraph 276A, a second subgraph 276B, up to the nth subgraph 276N is retrieved. As a result, the relevant information with respect to the corresponding user query is retrieved with maintained consistency, reliability, and credibility.

Figure 2F:
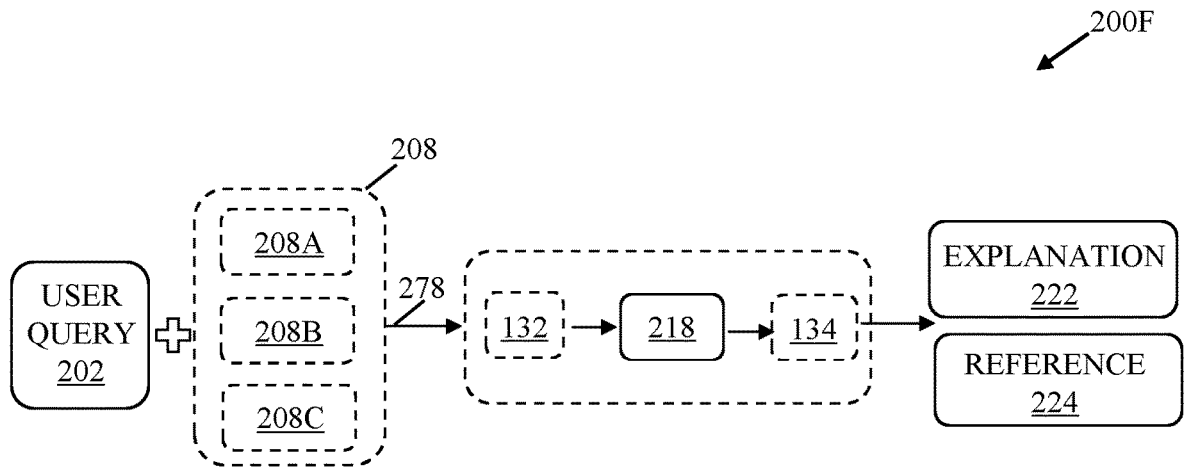
FIG. 2F is a diagram that depicts a generation of an intermediate rationale as an explanation output, in accordance with an embodiment of the present disclosure.

FIG. 2F is a diagram that depicts a generation of an intermediate rationale as an explanation output, in accordance with an embodiment of the present disclosure. FIG. 2F is described in conjunction with elements from FIGS. 1A, 1B, 2A, 2B, 2C, 2D, and 2E. With reference to FIG. 2F there is shown the generation of the intermediate rationale as the explanation output.

In an exemplary scenario, the rationale generator 126 is configured to convert the user query 202 and the retrieved first set of factual information that includes the set of paragraph output 208A, the set of triplet output 208B, and the set of graph output 208C to generate the first prompt instruction 218A, such as at operation 278. In an implementation, the hybrid retrieval system 116 is configured to retrieve the set of paragraph output 208A, the set of triplet output 208B, and the set of graph output 208C. Thereafter, at operation 278, the rationale generator 126, through a prompt engine 132 is configured to generate the first prompt instruction 218A. At operation 280, the generation of the first prompt instruction 218A is fed to the LLM 134 (or generative language model). In an implementation, the LLM 134 is trained to identify the relevant and factual information and further generate the transparent and evidence-based intermediate rationale as the explanation output. Moreover, the intermediate rationale as explanation output refers to a text summary or explanation that includes detailed and factual information as per the request of the user based on the set of evidence. Moreover, each statement in the explanation output is linked to at least one fact reference from the first set of factual information as evidence. As a result, the generation of the intermediate rationale as explanation output enables the rationale generator 126 to enhance the trustworthiness and comprehensibility of the retrieved first set of factual information and eliminates the generation of inaccurate or false information by generative language models (i.e., hallucination), such as by generating the explanation 222 and the reference 224.

Figure 2G:
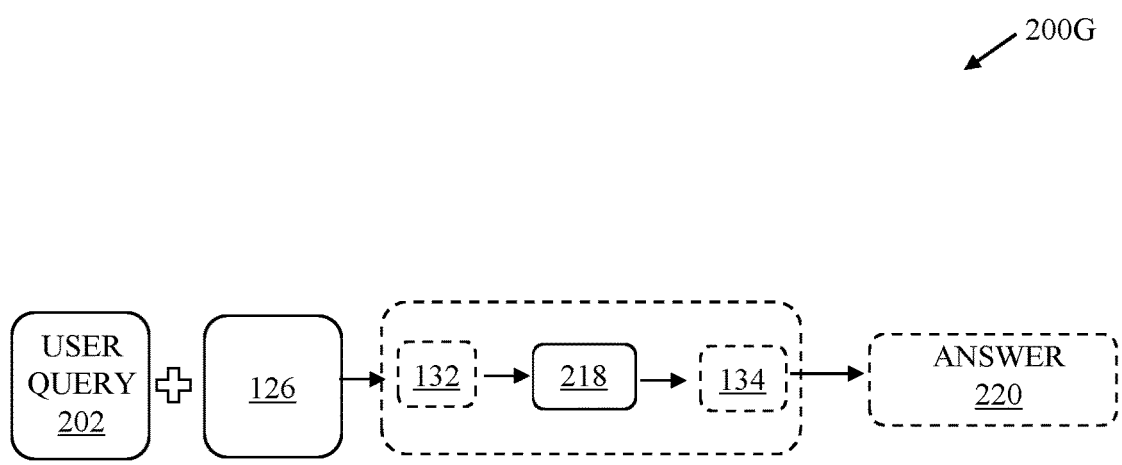
FIG. 2G is a diagram that depicts a generation of an answer output, in accordance with an embodiment of the present disclosure.

FIG. 2G is a diagram that depicts a generation of an answer output, in accordance with an embodiment of the present disclosure. FIG. 2G is described in conjunction with elements from FIGS. 1A, 1B, 2A, 2B, 2C, 2D, 2E, and 2F. With reference to FIG. 2G there is shown the generation of the answer output.

In an exemplary scenario, the answer generator 128, through the prompt engine 132 is configured to convert the user query 202 along with the generated explanation output, such as through the rationale generator 126 to the second prompt instruction 218B, which is further used to derive a concise and factually accurate answer output that is succinct in one or more language parameters as compared to the generated explanation output. As a result, the generated answer output resolves the major issue of hallucination (i.e., wrong, or false information generation) by providing the answer output with accurate and reliable factual reasoning. Furthermore, the generated second prompt instruction 218B is utilized by the LLM 134 to generate the final concise answer output 220. As a result, the factually accurate answers with credible and reliable explanation output are obtained.

Figure 3A:
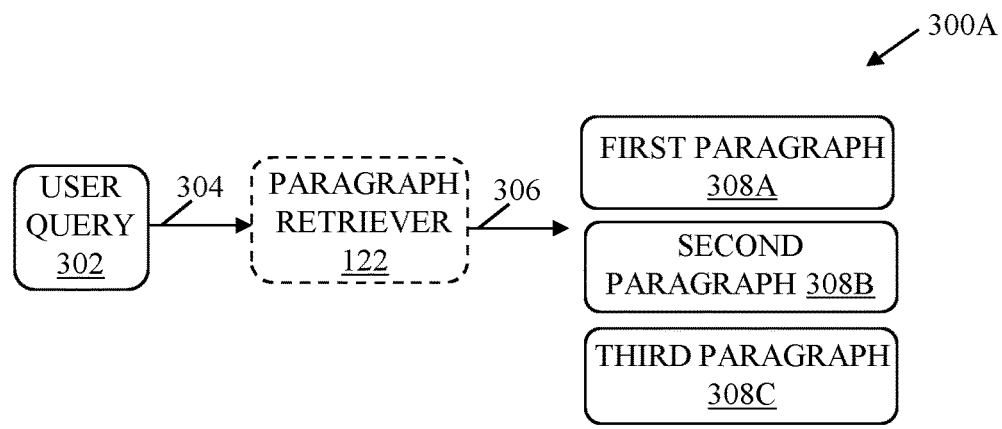
FIG. 3A is a diagram that depicts an exemplary scenario of paragraph retrieval operation, in accordance with an embodiment of the present disclosure.

FIG. 3A is a diagram that depicts an exemplary scenario of paragraph retrieval operation, in accordance with an embodiment of the present disclosure. FIG. 3A is described in conjunction with elements from FIGS. 1A, 1B, and 2A, to 2G. With reference to FIG. 3A, there is shown a user query 302 that is electronically processed by maintaining the factual consistency during the processing.

In an exemplary scenario, the user query 302 includes a question indicating of Mahatma Gandhi used G Suite or not. Furthermore, the user query 302 is received by the paragraph retriever 122, such as at operation 304. The paragraph retriever 122 is configured to retrieve relevant paragraphs using two retrievers, such as a semantic search retriever and a lexical Search retriever concurrently. Finally, at operation 306, a set of paragraphs, such as a first paragraph 308A, a second paragraph 308B, and a third paragraph 308C are retrieved. In an implementation, the first paragraph 308A includes a paragraph stating that "Google is a multinational technology company founded in 1998 by Larry Page and Sergey Brin. It is best known for its search engine, which revolutionized the way we access information on the internet." In another implementation, the second paragraph 308B includes a paragraph indicating "Mahatma Gandhi, born on Oct. 2, 1869, in Porbandar, Gujarat, India, had a modest upbringing. He came from a devout Hindu family and imbibed values of truth, nonviolence, and simplicity from a young age." In yet another implementation, the third paragraph 308C includes a paragraph indicating "Today's technology landscape is deeply intertwined with Google's vast array of services and innovations. From its powerful search engine that processes billions of queries daily, to its cloud computing platform enabling businesses to scale with ease, Google continues to shape the digital world." As a result, the relevant and factually consistent set of paragraph output is retrieved with enhanced accuracy and reliability.

Figure 3B:
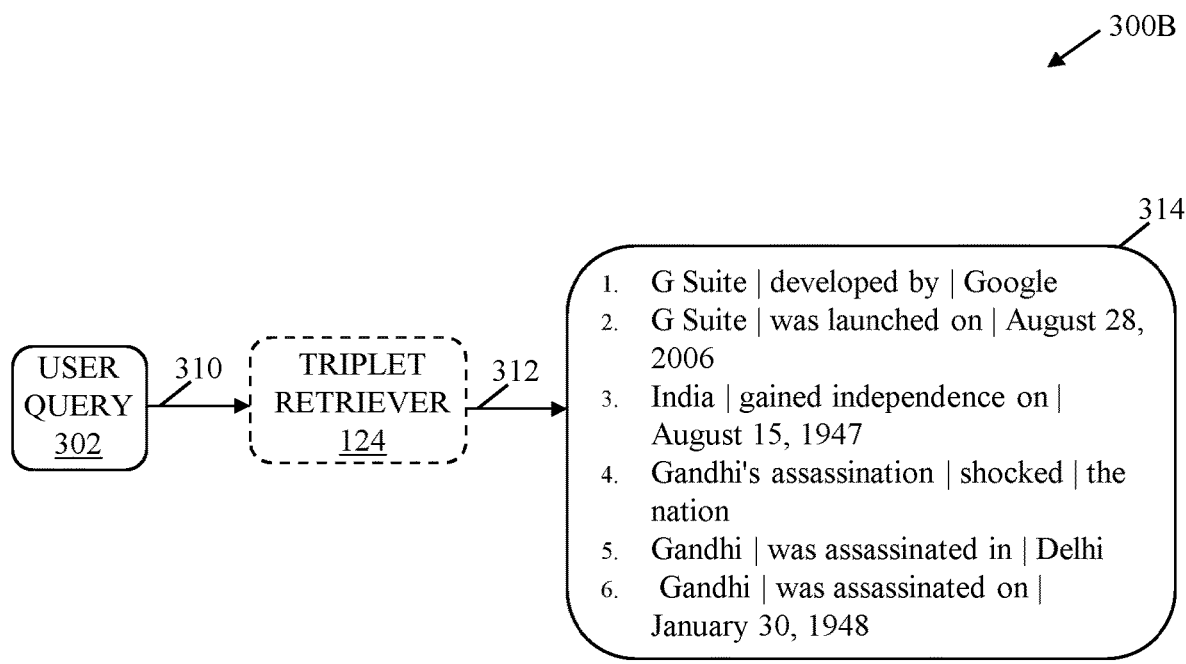
FIG. 3B is a diagram that depicts an exemplary scenario of triplet retrieval operation, in accordance with an embodiment of the present disclosure.

FIG. 3B is a diagram that depicts an exemplary scenario of triplet retrieval operation, in accordance with an embodiment of the present disclosure. FIG. 3B is described in conjunction with elements from FIGS. 1A, 1B, 2A to 2C, and 3A. With reference to FIG. 3B there is shown the triplet retrieval operation.

In an exemplary scenario, the triplet retrieval operation is executed by triplet retriever 124, which is configured to retrieve relevant triplets using two retrievers, such as by a semantic search retriever and a lexical Search retriever concurrently. At operation 310, triplet retriever 124 is configured to concurrently perform the semantic encoding and lexical encoding 246 of the user query 302. Furthermore, at operation 312, the triplet retriever 124 is configured to retrieve a set of triplets 314, such as "a first triplet—G Suite|developed by|Google, a second triplet—G Suite|was launched on|Aug. 28, 2006, a third triplet—India|gained independence on|Aug. 15, 1947, a fourth triplet—Gandhi's assassination|shocked|the nation, a fifth triplet—Gandhi-|was assassinated in|Delhi, and a sixth triplet—Gandhi|was assassinated on|Jan. 30, 1948". As a result, the relevant and factually consistent set of triplet output is retrieved with enhanced accuracy and reliability.

Figure 3C:
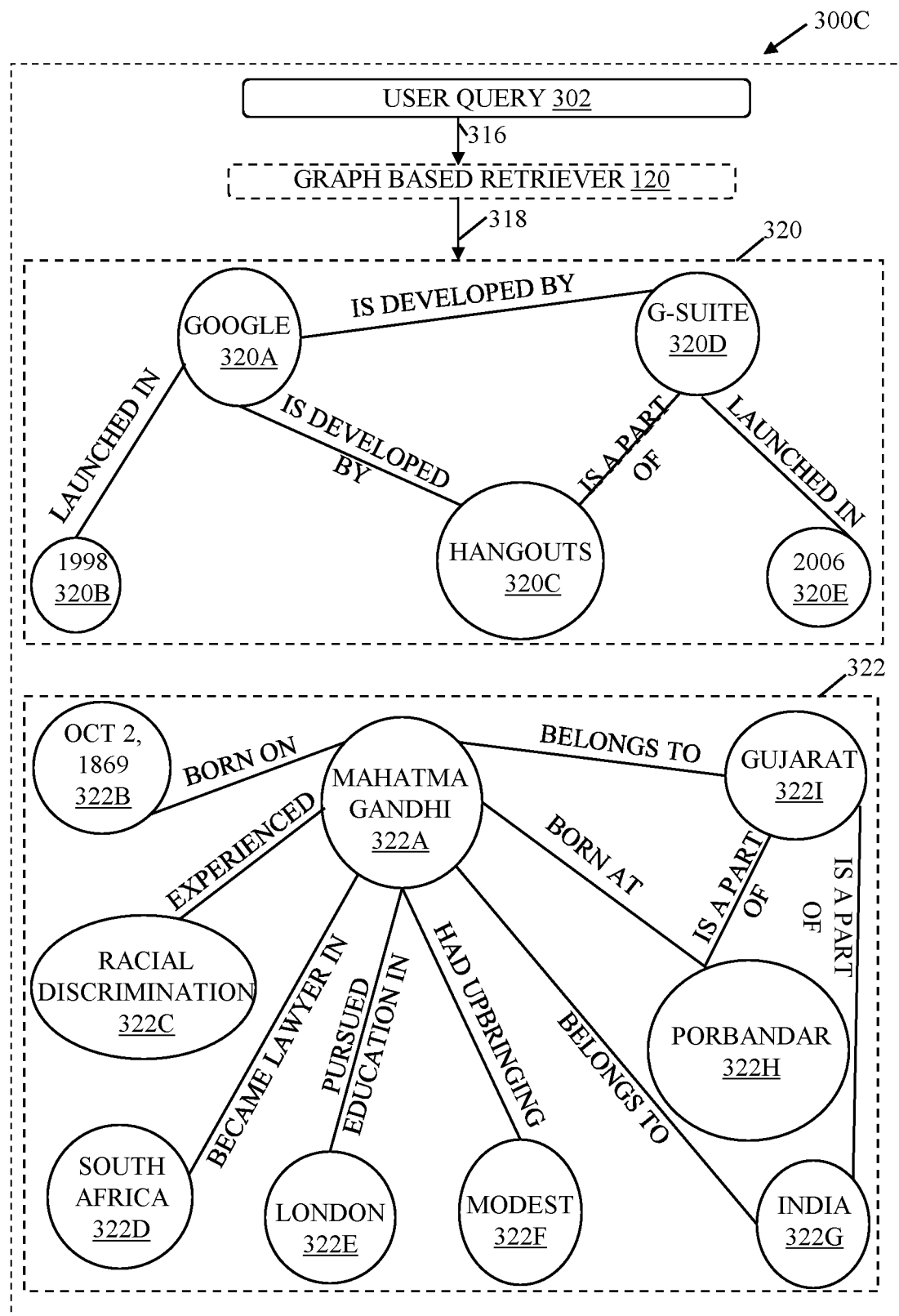
FIG. 3C is a diagram that depicts an exemplary scenario of graph retrieval operation, in accordance with an embodiment of the present disclosure.

FIG. 3C is a diagram that depicts an exemplary scenario of graph retrieval operation, in accordance with an embodiment of the present disclosure. FIG. 3C is described in conjunction with elements from FIGS. 1A, 1B, 2A to 2G, 3A, and 3B. With reference to FIG. 3C there is shown the graph retrieval operation.

In an implementation scenario, at operation 316, the graph-based retriever 120 is configured to receive the user query 302 and further retrieve a set of sub-graphs from a knowledge graph database based on the one or more topic node entities and the user query 302, such as at operation 318. In an implementation, the set of sub-graphs, such as a first subgraph 320 and a second subgraph 322 are retrieved. In an example, the first subgraph 320 includes nodes connected with each other via a relation term, such as a first node 320A with the value "Google" is connected with a second node 320B with the value "1998" is connected with the relation term "launched in" in the knowledge graph database. These connections between nodes (e.g., between the first node 320A and the second node 320B) indicate that "Google was launched in 1998". Similarly, a third node 320C includes a value "Hangout" is connected with a first node 320A with the value "Google" is connected with the relation term "is developed by", which indicates that "Google is developed by Hangouts". Furthermore, the third node 320C with the value "Hangouts" is connected with a fourth node 320D with value "G-Suite", via the relation term "is a part of", which indicates that "Hangouts is a part of a G-Suite." In another example, the first node 320A and the third node 320C are connected with each other through a relation term "is developed by" indicating that "G-Suite is developed by Google". Similarly, the fourth node 320D is connected with a fifth node 320E with value "2006" through a relation term "launched in" indicates that "G-Suite is launched in 2006".

In yet another example, a second subgraph 322 includes nodes connected with each other via relation term, such as a first node 322A with a value of "Mahatma Gandhi" is connected with a second node 322B with value "2 Oct. 1869" via the relation term "born on" indicating that "Mahatma Gandhi was born on $2^{nd}$ October 1869". Similarly, a third node 322C with value "racial discrimination" is connected with the first node 322A with value "Mahatma Gandhi" via relation term "experienced" indicating that "Mahatma Gandhi experienced racial discrimination". Furthermore, the first node 322A is connected with a fourth node 322D with value "South Africa" via relation term "became lawyer in" indicating that "Mahatma Gandhi became a lawyer in South Africa and a fifth node 322E with value "Landon" is connected with the first node 322A via the relation term "pursued education in" indicating that "Mahatma Gandhi pursued an education in "London. Similarly, the first node 322A is connected with a sixth node 322F with a value "modest" via relation term "had upbringing" indicating that "Mahatma Gandhi had an upbringing modest" and a seventh node 322G with value "India" is connected with the first node 322A via the relation term "belongs to" indicating that "Mahatma Gandhi belongs to India". Furthermore, the first node 322A is connected with an eighth node 322H with a value Porbandar via the relation term "born at" indicating that "Mahatma Gandhi was born at Porbandar" and a ninth node 3241 with value "Gujrat" is connected with the first node 322A via the relation term "belongs to" indicating that "Mahatma Gandhi belongs to Gujrat". Similarly, the seventh node 322G with value "India" is connected with the ninth node 3241 with value "Gujrat" via relation term "is part of", which indicates that "Gujrat is a part of India" and the eighth node 322H with a value "Porbandar" is connected with the ninth node 3241 with value "Gujrat" via relation term "is a part of", which indicates that "Porbandar is a part of Gujrat". As a result, the relevant subgraphs with respect to the user query 302 are retrieved with maintained consistency, reliability, and credibility.

Figure 3D:
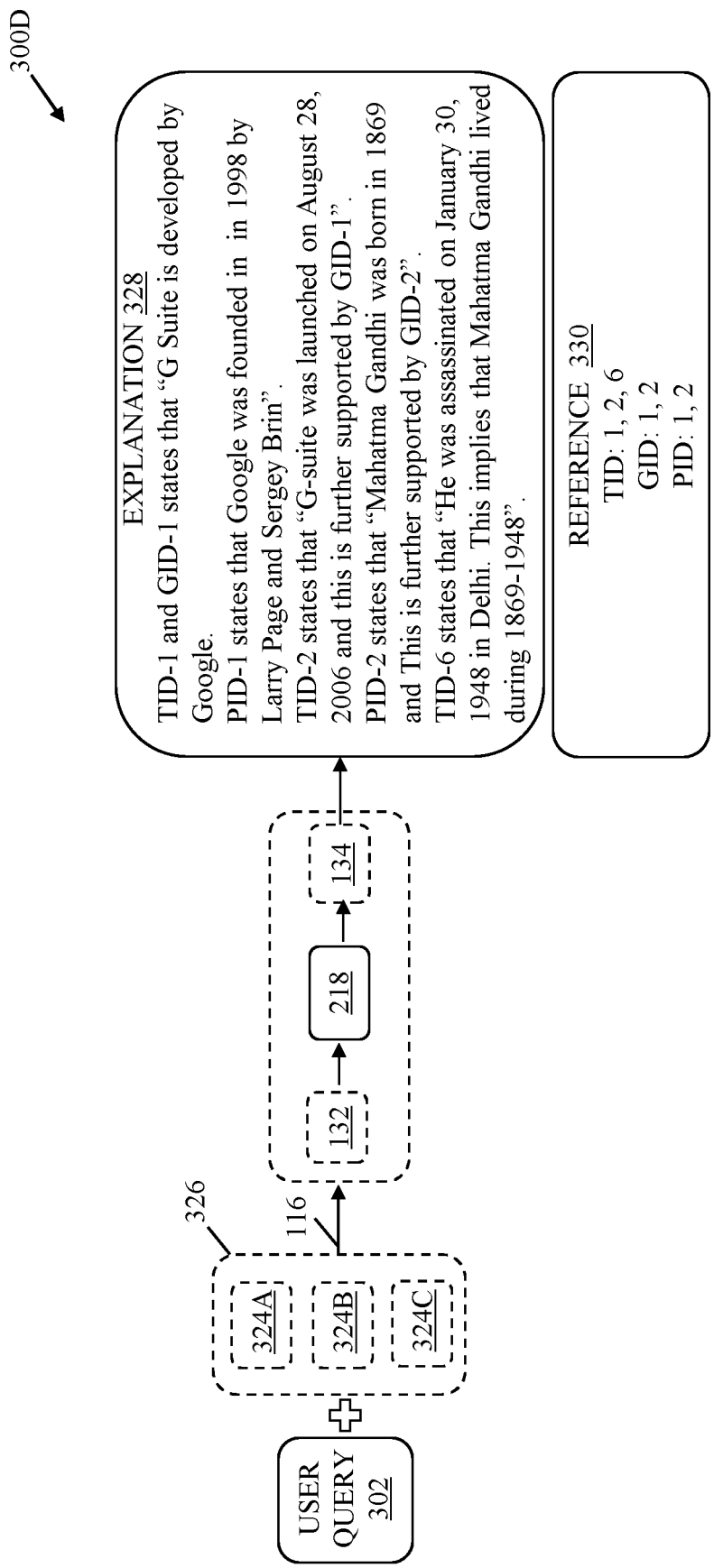
FIG. 3D is a diagram that depicts a generation of an explanation output, in accordance with an embodiment of the present disclosure.

FIG. 3D is a diagram that depicts a generation of an explanation output, in accordance with an embodiment of the present disclosure. FIG. 2F is described in conjunction with elements from FIGS. 1A, 1B, 2A to 2E, and 3A to 3C. With reference to FIG. 3D there is shown the generation of the explanation output.

In an exemplary scenario, the rationale generator 126 is configured to convert the user query 302 and the retrieved first set of factual information that includes the set of paragraph output 324A, the set of triplet output 324B, and the set of graph output 324C to generate the first prompt instruction 218A, such as at operation 326. In an implementation, the hybrid retrieval system 116 is configured to retrieve the set of paragraph output 324A, the set of triplet output 324B, and the set of graph output 324C. Thereafter, the prompt engine 132 is configured to generate the first prompt instruction 218A. The generation of the first prompt instruction 218A is fed to the LLM 134 (generative language model). In an implementation, the LLM 134 is trained to identify the relevant and factual information and further generate the transparent and evidence-based intermediate rationale as the explanation output. Moreover, each statement in the explanation output is linked to at least one fact reference from the first set of factual information as evidence. As a result, the generation of the explanation output enables the rationale generator 126 to generate an explanation 328 and a reference 330. In an implementation, the explanation 328 includes a TID-1 (i.e., a Triplet ID-1 is assigned to a triplet, which states that "G Suite is developed by Google"), a GID-1 (i.e., a graph ID-1 is assigned to a graph as shown in FIG. 3C, which states that "G Suite is developed by Google"), a TID-2 (i.e., a triplet ID-2 states that "states that G-suite was launched on Aug. 28, 2006 and this is further supported by GID-1"), a PID-2 (i.e., a paragraph ID-1 states that "Google was founded in in 1998 by Larry Page and Sergey Brin"), a GID-2 (i.e., a graph ID-2), and a TID-6 (i.e., a triplet ID-6). Moreover, the explanation 328 indicates that "TID-1 and GID-1 state that "G Suite is developed by Google". PID-1 states that Google was founded in 1998 by Larry Page and Sergey Brin. TID-2 states that G-suite was launched on Aug. 28, 2006, and this is further supported by GID-1 and PID-2 states that Mahatma Gandhi was born in 1869 and This is further supported by GID-2. TID-6 states that he was assassinated on Jan. 30, 1948, in Delhi. This implies that Mahatma Gandhi lived during 1869-1948." In another implementation, the reference 330 indicates "TID: 1, 2, 6", "GID: 1, 2", and "PID: 1, 2". As a result, the trustworthiness and comprehensibility of the retrieved first set of factual information are enhanced, which eliminates the generation of inaccurate or false information by generative language models (i.e., hallucination).

Figure 3E:
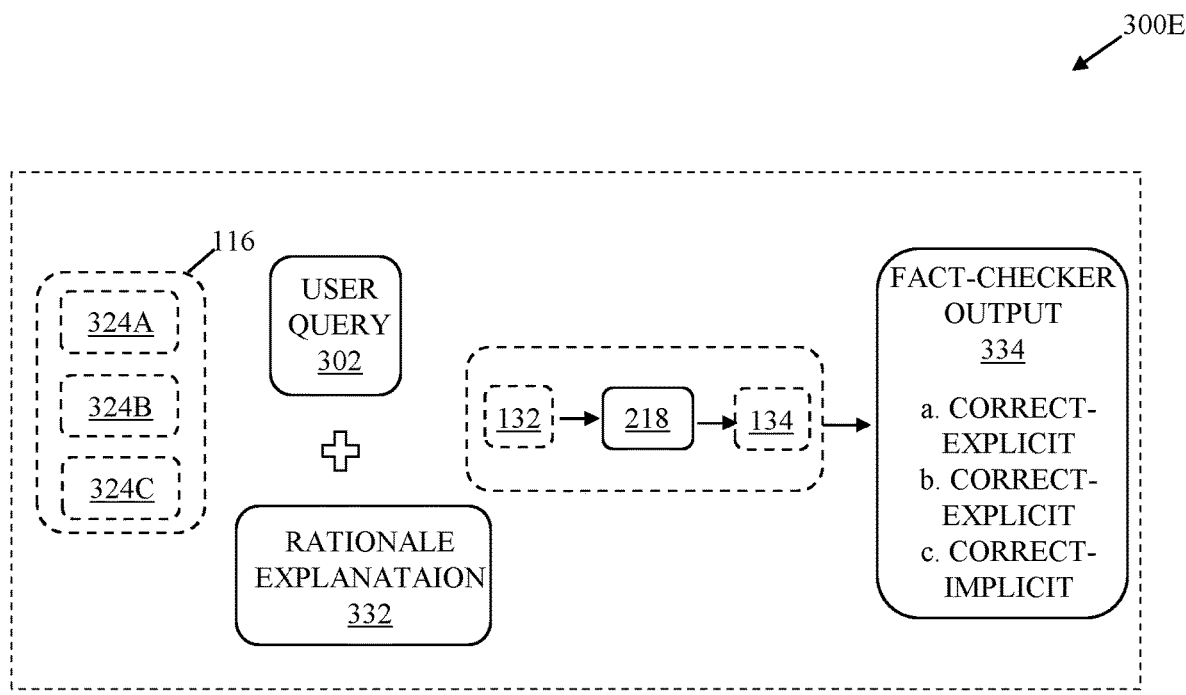
FIG. 3E is a diagram that depicts an automatic fact-checking operation, in accordance with an embodiment of the present disclosure.

FIG. 3E is a diagram that depicts an automatic fact-checking operation, in accordance with an embodiment of the present disclosure. FIG. 3E is described in conjunction with elements from FIGS. 1A, 1B, 2A to 2E, and 3A to 3D. With reference to FIG. 3E there is shown the automatic fact-checking operation.

In an implementation scenario, an auto-checker utilizes the LLM 134 and a set of prompt instruction 218 to perform the automatic fact-checking operation. The user query 302 and the generated explanation output 332 are used by the auto-checker to generate the set of prompt instruction 218, such as by using the prompt engine 132. Thereafter, the generated set of prompt instruction 218 is utilized by the LLM 134 to assign a category to each rationale point indicating if the generated explanation output is factually correct (explicitly or implicitly) or factually incorrect, such as by generating a fact checker output 334. By employing the LLM 134, the Auto-Fact Checker leverages its language comprehension capabilities to analyze and understand the content of the rationales, which allows the server 102 to compare the information presented in the rationales with the known facts and make informed determinations about the factual accuracy. Furthermore, the auto-fact checker is configured to categorize the rationale points into "Factually correct—explicit," "Factually correct—implicit," or "Factually incorrect" as shown in the fact checker output 334, which enables the reliable and trustworthy information. Moreover, the rationale points that are categorized as factually correct (explicitly or implicitly) rationale points indicate that the information is supported by the provided facts, enhancing the credibility of the generated responses. Alternately, the rationale points that are categorized as factually incorrect highlights inaccuracies or inconsistencies that may arise during the generation process. As a result, the auto-fact checker ensures the factual accuracy of the rationales generated by the system (i.e., the system 100A of FIG. 1A), such as by verifying the validity of the information present in the rationales, whether it is explicitly extracted from the provided facts or implicitly derived.

Figure 3F:
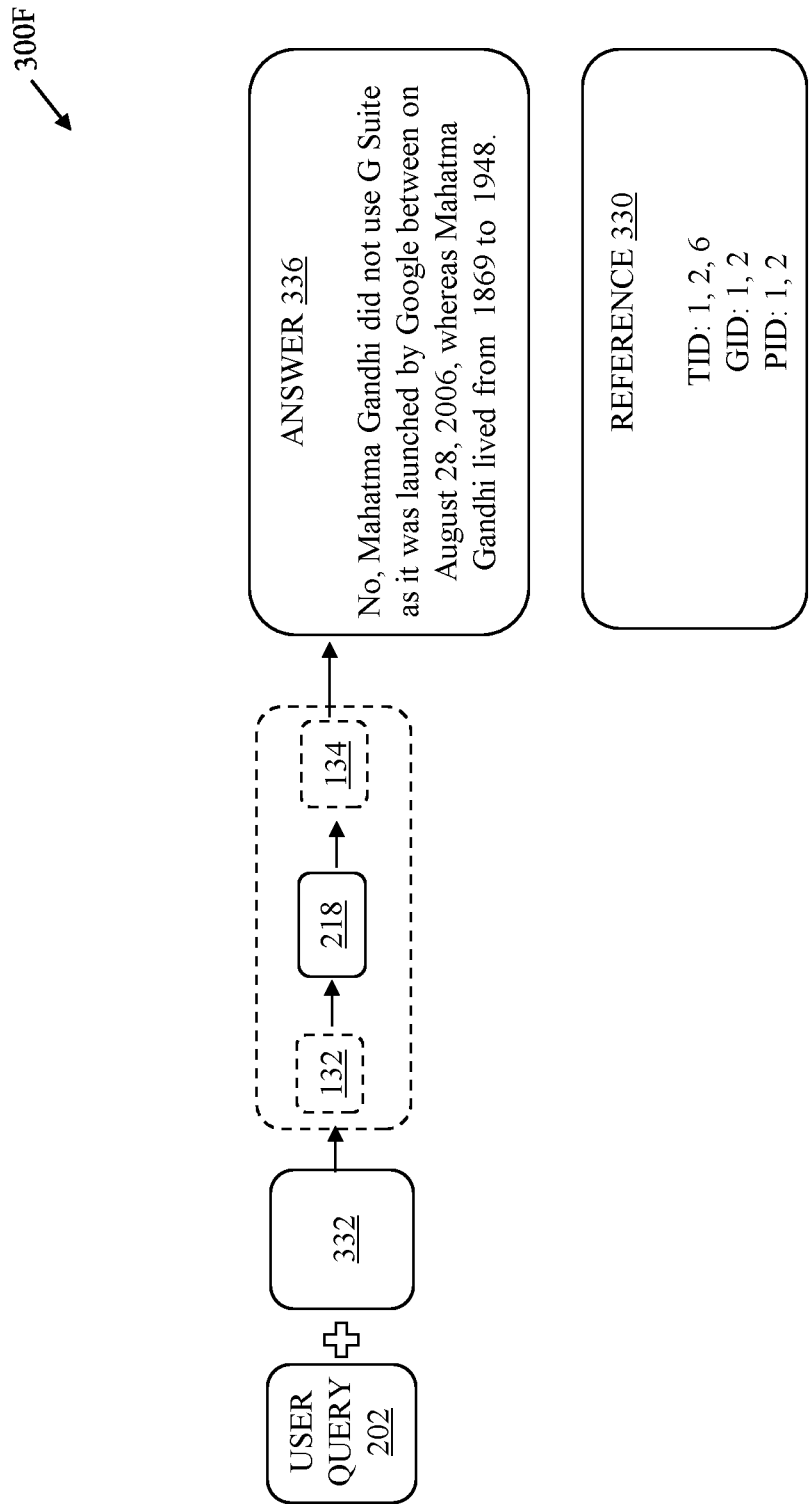
FIG. 3F is a diagram that depicts an exemplary scenario for generating an answer output, in accordance with an embodiment of the present disclosure.

FIG. 3F is a diagram that depicts an exemplary scenario for generating an answer output, in accordance with an embodiment of the present disclosure. FIG. 2F is described in conjunction with elements from FIGS. 1A, 1B, 2A to 2E, and 3A to 3E. With reference to FIG. 3F there is shown the generation of the answer output.

In an exemplary scenario, the answer generator 128 is configured to generate the answer output. The user query 302 along with the generated explanation output 332 is re-fed to the generative language model to derive the answer output 336 that is succinct in one or more language parameters as compared to the generated explanation output 332. The answer generator 128 is configured to convert the user query 302 and the explanation output 332 into the second prompt instruction 218B through the prompt engine 132. The generation of the second prompt instruction 218B is fed to the LLM 134 (generative language model). In an implementation, the LLM 134 is trained to generate the transparent and evidence-based answer output 336 along with the reference 330. In an implementation, the answer output 336 indicates "No, Mahatma Gandhi did not use G Suite as it was launched by Google on Aug. 28, 2006, whereas Mahatma Gandhi lived from 1869 to 1948." In another implementation, the reference 330 indicates "TID: 1, 2, 6", "GID: 1, 2", and "PID: 1, 2". As a result, the trustworthiness and comprehensibility of the retrieved answer output 336 are enhanced, which eliminates the generation of inaccurate or false information by generative language models (i.e., hallucination).

Figure 4:
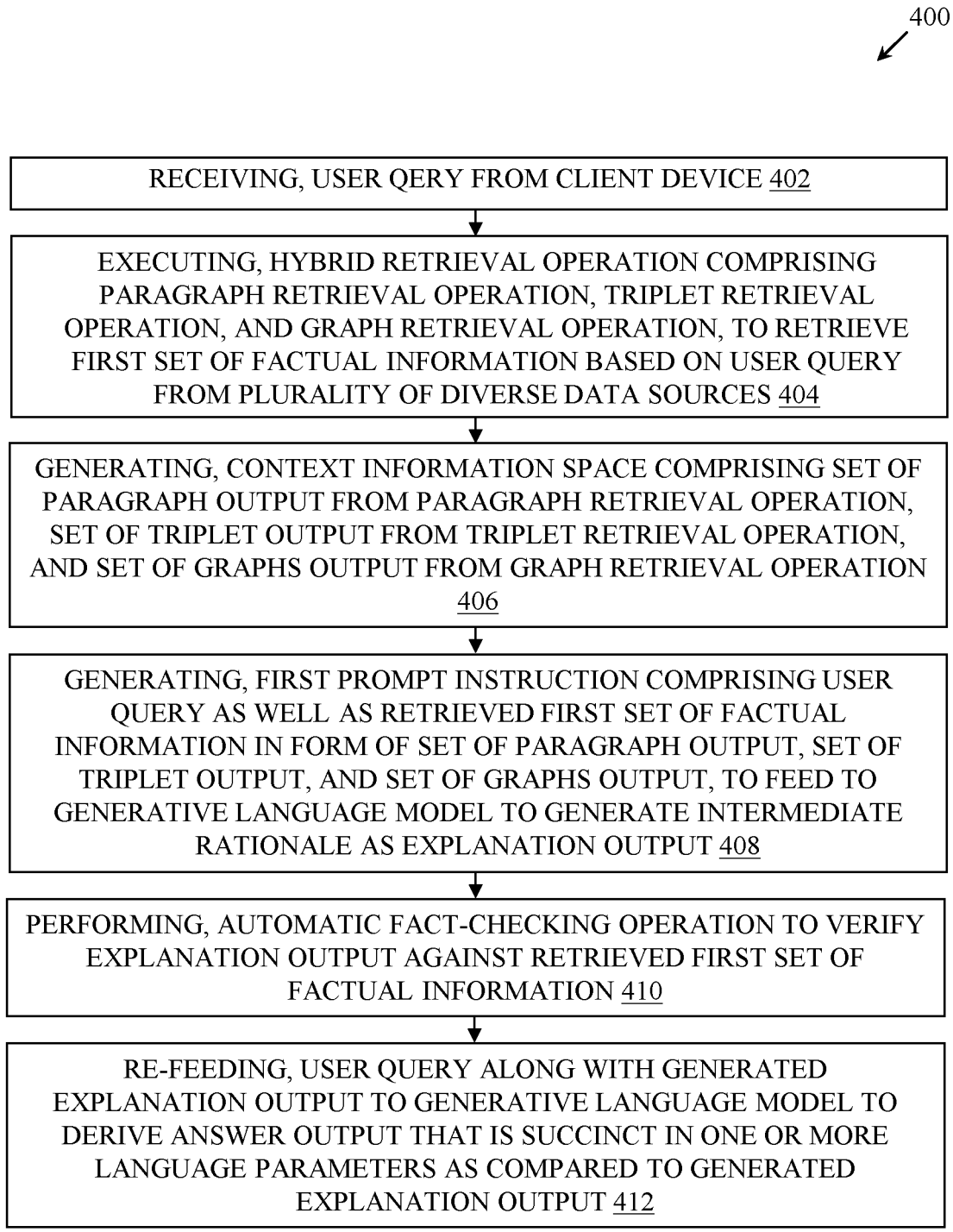
FIG. 4 is a flowchart of a method for electronic processing of user queries maintaining factual consistency during processing, in accordance with an embodiment of the present disclosure.

FIG. 4 is a flowchart of a method for electronic processing of user queries maintaining factual consistency during processing, in accordance with an embodiment of the present disclosure. FIG. 4 is explained in conjunction with elements from FIGS. 1A, 1B, 2A to 2G, and 3A to 3F. With reference FIG. 4, there is shown a flowchart of a method 400. The method 400 is executed at the server 102 (of FIG. 1A). The method 400 may include steps 402 to 412. In accordance with an embodiment, the method 400 includes a pre-processing stage. The processing stage further includes acquiring a dataset of documents from the plurality of diverse data sources and creating the knowledge graph database 108, the text embedding database 110, the node entity embedding database 112, and the triplet embedding database 114 from the acquired dataset of documents based on a plurality of document processing operations. In an implementation, the server 102 (of FIG. 1) is configured to acquire the dataset of documents from the plurality of diverse data sources and further to create the knowledge graph database 108, the text embedding database 110, the node entity embedding database 112, and the triplet embedding database 114 from the acquired dataset of documents based on a plurality of document processing operations In accordance with an embodiment, the pre-processing stage further includes indexing, caching, and creating parallel processing pathways for retrieval of information from the created knowledge graph database, the text embedding database, the node entity embedding database, and the triplet embedding database. As a result, the server 102 is enabled to retrieve the data with reduced overall processing time.

There is provided the method 400 for the electronic processing of the user queries by maintaining factual consistency during the processing. The method 400 is used to provide a comprehensive solution that includes retrieval of the factual information from the plurality of diverse data sources, context generation, and automatic fact-checking to process the user queries while maintaining factual consistency for the generation of accurate, efficient, and reliable answers that are backed by factual evidence. The electronic processing of the user queries utilizes the reasoning abilities of large language models (LLM) to incorporate rationale as an explanation that acts as an evidence-based explanation for delivering concise, transparent, detailed, and factually accurate answers.

At step 402, the method 400 includes receiving, by the server 102, a user query from a client device. In other words, a plurality of users can send user queries, such as through the plurality of client devices 106 to the server 102 simultaneously.

At step 404, the method 400 further includes executing, by the server 102, a hybrid retrieval operation comprising a paragraph retrieval operation, a triplet retrieval operation, and a graph retrieval operation, to retrieve a first set of factual information based on the user query from a plurality of diverse data sources. The hybrid retrieval operation corresponds to an operation that is executed by the server 102 to retrieve the first set of relevant information from the plurality of diverse data sources that includes comprehensive context (i.e., granular-level information and global-level knowledge) for a received user query.

In accordance with an embodiment, the paragraph retrieval operation and the triplet retrieval operation are text-based retrieving operation that involves finding relevant and factual information present in the plurality of diverse data sources, whereas the graph retrieval operation is based on a graph-based database created by extracting information pieces from plurality of diverse data sources. As a result, the paragraph retrieval operation, the triplet retrieval operation, and the graph retrieval operation enable the system 100A to gather comprehensive, diverse, relevant, and factual information that is related to the user query received by the client device from the plurality of client devices 106 with reduced processing time.

In accordance with an embodiment, the paragraph retrieval operation includes concurrently performing semantic encoding and lexical encoding of the user query and searching and extracting a set of paragraphs from a semantic a semantic chunk and a textual chunk of a paragraphs embedding database. Advantageously, the paragraph retrieval operation enables the system 100A (of FIG. 1A) to search and extract the relevant and factual set of paragraphs that matches the requirements of the received user query.

In accordance with an embodiment, the paragraph retrieval operation further comprises re-ranking the extracted set of paragraphs to obtain a re-ordered set of paragraphs that corresponds to the set of paragraph output from the paragraph retrieval operation. Beneficially, the re-ordering of the extracted paragraphs is used to provide the most pertinent paragraphs (i.e., TOP-P paragraphs) as requested by a user through the client device.

In accordance with an embodiment, the triplet retrieval operation includes concurrently performing semantic encoding and lexical encoding of the user query and searching and extracting a set of triplets from a text embedding database based on the semantic encoding and the lexical encoding. As a result, the triplet retrieval operation enables the system 100A (of FIG. 1A) to search and extract the relevant set of triplets that indicates the subject as well the relation of the subject with the object that matches the requirements of the received user query.

In accordance with an embodiment, the triplet retrieval operation further includes re-ranking the extracted set of triplets to obtain a re-ordered set of triplets that corresponds to the set of triplet output from the triplet retrieval operation. Beneficially, the re-ordering of the extracted triplet is used to provide the most pertinent triplets (i.e., TOP-P triplets) as requested by a user through the client device.

In accordance with an embodiment, the graph retrieval operation includes extracting a plurality of query entities from the user query, searching the plurality of query entities in a node entity embedding database to retrieve one or more topic node entities, and retrieving a set of sub-graphs from a knowledge graph database based on the one or more topic node entities and the user query. As a result, a large complex data stored in the form of head-relation-tail can be retrieved without converting the data into textual format.

In accordance with an embodiment, the graph retrieval operation further includes re-ranking the retrieved set of sub-graphs to obtain a re-ordered set of sub-graphs that corresponds to the set of graphs output from the graph retrieval operation. Beneficially, the re-ordering of the extracted graphs is used to provide the most pertinent graphs as requested by a user through the client device.

At step 406, the method 400 further includes generating, by the server 102, a context information space comprising a set of paragraph output from the paragraph retrieval operation, a set of triplet output from the triplet retrieval operation, and a set of graphs output from the graph retrieval operation. Beneficially, generating the context information space is used to store the retrieved first set of information that includes the set of paragraphs output, the set of triplets output, and the set of graph output is used to store for further processing. Furthermore, at step 408, the method 400 further includes generating, by the server 102, a first prompt instruction comprising the user query as well as the retrieved first set of factual information in the form of the set of paragraph output, the set of triplet output, and the set of graphs output, to feed to a generative language model to generate an intermediate rationale as explanation output. As a result, the generation of the intermediate rationale as explanation output enables the method 400 to enhance the trustworthiness and comprehensibility of the retrieved first set of factual information and eliminates the generation of inaccurate or false information by generative language models (i.e., hallucination).

In accordance with an embodiment, the method 400 further includes assigning a fact identifier to each statement in the intermediate rational as an explanation output. The fact identifier points to a fact taken from one of: the set of paragraph output, the set of triplet output, and the set of graphs output, to generate each statement in the explanation output. The fact identifier allows the server 102 (of FIG. 1A) to identify the fact taken from the one of the set of paragraph output, the set of triplet output, and the set of graphs output that acts as a reference for the generation of each of the statement in the explanation output.

In accordance with an embodiment, the fact identifier is one of a unique paragraph identifier pointing to one paragraph of the set of paragraph output, a unique triplet identifier pointing to the set of triplet output, and a unique graph identifier pointing to the set of graphs output. Moreover, each statement in the explanation output is linked to at least one fact reference from the first set of factual information as evidence. Advantageously, each of the fact identifiers acts as an indicator that indicates the factual reasoning behind each of the generated statements of the explanation output based on the retrieved factual information.

At step 410, the method 400 further includes performing, by the server 102, an automatic fact-checking operation to verify the explanation output against the retrieved first set of factual information. Furthermore, at step 412, the method 400 further includes re-feeding, by the server 102, the user query along with the generated explanation output to the generative language model to derive an answer output that is succinct in one or more language parameters as compared to the generated explanation output and the answer output includes a verified and evidence-supported answer and at least one fact reference from the first set of factual information. As a result, the generated answer output resolves the major issue of hallucination (i.e., wrong, or false information generation) by providing the answer output with accurate and reliable factual reasoning. In accordance with an embodiment, the method 400 further includes restricting the answer output based on the generated intermediate rational as an explanation output. As a result, the answer output based on the generated explanation output leads to more accurate, reliable, and comprehensive responses that eliminate the possibility of hallucination is generated.

In accordance with an embodiment, the method 400 further includes generating a second prompt instruction comprising the user query as well as the generated intermediate rationale as the explanation output, for the re-feeding of the generative language model to generate the answer output. The second prompt instruction includes the user query and the generated explanation output that is used to generate the answer output, such as by re-feeding the second prompt instruction to the generative language model. As a result, the answer output with improved reliability and credibility is generated. Hence, the generation of the comprehensive and relevant answer output can be further used to support a variety of real-time applications, such as question-answering, information retrieval, and knowledge recovery.

In accordance with an embodiment, the method further includes performing an automatic grading of the answer output, and the automatic grading involves evaluating the answer output against the generated intermediate rationale as the explanation output. As a result, the automatic grading of the answer output enables the system 100A (of FIG. 1) to ensure the quality of the answer output with enhanced reliability, and explanation by maintaining the overall factual consistency throughout the processing.

The method 400 is used to provide an efficient, accurate, consistent, comprehensive, and factually consistent electronic processing of the user queries. The hybrid retrieval operation provides an optimized and effective retrieval of the factual information concurrently. Moreover, the retrieved factual information includes information at both granular-level information (e.g., paragraphs and triplets) and global-level knowledge (e.g., subgraphs) from the diverse data sources (i.e., large, and complex datasets) with different data types (e.g., text, graph, images, and the like). As a result, the overall processing time which is required to retrieve the factual information is reduced.

The generation of the context information space is used to provide structured and organized factual information with accurate and comprehensive factual reasoning. Further, the factual information is used to generate the intermediate rationale as an explanation output that acts as an evidence-based explanation of the retrieved factual information, thereby resolving the major issue of hallucination (i.e., false information generation). Furthermore, the auto fact-checking operation is used to verify the generated evidence-based explanations against retrieved factual information to ensure factual accuracy and reliability. Finally, the re-feeding of the user query with the generated explanation output to the generative language model for deriving an answer output that is succinct in one or more language parameters is used to provide more reliable and precise answers.

The steps 402 to 412 are only illustrative, and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe, and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

What is claimed is:

1. A method for electronic processing of user queries maintaining factual consistency during processing, the method comprising:
   receiving, by a server, a user query from a client device;
   executing, by the server, a hybrid retrieval operation comprising a paragraph retrieval operation, a triplet retrieval operation, and a graph retrieval operation, to retrieve a first set of factual information based on the user query from a plurality of diverse data sources;
   generating, by the server, a context information space comprising a set of paragraph output from the paragraph retrieval operation, a set of triplet output from the triplet retrieval operation, and a set of graphs output from the graph retrieval operation;
   generating, by the server, a first prompt instruction comprising the user query as well as the retrieved first set of factual information in the form of the set of paragraph output, the set of triplet output, and the set of graphs output, to feed to a generative language model to generate an intermediate rationale as explanation output,
   wherein each statement in the explanation output is linked to at least one fact reference from the first set of factual information as evidence;
   performing, by the server, an automatic fact-checking operation to verify the explanation output against the retrieved first set of factual information; and
   re-feeding, by the server, the user query along with the generated explanation output to the generative language model to derive an answer output that is succinct in one or more language parameters as compared to the generated explanation output,
   wherein the answer output comprises a verified and evidence-supported answer and at least one fact reference from the first set of factual information, and
   wherein the triplet retrieval operation comprises concurrently performing semantic encoding and lexical encoding of the user query and searching and extracting a set of triplets from a text embedding database based on the semantic encoding and the lexical encoding.

2. The method as claimed in claim 1, further comprising a pre-processing stage comprising:
   acquiring a dataset of documents from the plurality of diverse data sources; and
   creating a knowledge graph database, a text embedding database, a node entity embedding database, and a triplet embedding database from the acquired dataset of documents based on a plurality of document processing operations.

3. The method as claimed in claim 2, wherein the pre-processing stage further comprises indexing, caching, and creating parallel processing pathways for retrieval of information from the created knowledge graph database, the text embedding database, the node entity embedding database, and the triplet embedding database.

4. The method according to claim 1, wherein the paragraph retrieval operation and the triplet retrieval operation are text-based retrieving operation that involves finding relevant and factual information present in the plurality of diverse data sources, whereas the graph retrieval operation is based on a graph-based database created by extracting information pieces from plurality of diverse data sources.

5. The method according to claim 1, wherein the paragraph retrieval operation comprises:
   concurrently performing semantic encoding and lexical encoding of the user query; and
   searching and extracting a set of paragraphs from a semantic chunk and a textual chunk of a paragraphs embedding database.

6. The method according to claim 5, wherein the paragraph retrieval operation further comprises re-ranking the extracted set of paragraphs to obtain a re-ordered set of paragraphs that corresponds to the set of paragraph output from the paragraph retrieval operation.

7. The method according to claim 1, wherein the triplet retrieval operation further comprises re-ranking the extracted set of triplets to obtain a re-ordered set of triplets that corresponds to the set of triplet output from the triplet retrieval operation.

8. The method as claimed in claim 1, wherein the graph retrieval operation comprises:
   extracting a plurality of query entities from the user query;
   searching the plurality of query entities in a node entity embedding database to retrieve one or more topic node entities; and
   retrieve a set of sub-graphs from a knowledge graph database based on the one or more topic node entities and the user query.

9. The method as claimed in claim 8, wherein the graph retrieval operation further comprises re-ranking the retrieved set of sub-graphs to obtain a re-ordered set of sub-graphs that corresponds to the set of graphs output from the graph retrieval operation.

10. The method according to claim 1, further comprising assigning a fact identifier to each statement in the explanation output, wherein the fact identifier points to a fact taken from one of: the set of paragraph output, the set of triplet output, and the set of graphs output, to generate each statement in the explanation output.

11. The method according to claim 10, wherein the fact identifier is one of: a unique paragraph identifier pointing to one paragraph of the set of paragraph output, a unique triplet identifier pointing to the set of triplet output, and a unique graph identifier pointing to the set of graphs output.

12. The method according to claim 1, further comprising generating, by the server, a second prompt instruction comprising the user query as well as the generated intermediate rationale as the explanation output, for the re-feeding of the generative language model to generate the answer output.

13. The method according to claim 1, further comprising performing an automatic grading of the answer output, wherein the automatic grading involves evaluating the answer output against the generated explanation output.

14. The method according to claim 1, further comprises restricting the answer output based on the generated explanation output.

15. A system for electronic processing of user queries maintaining factual consistency during processing, the system comprising:
   a server configured to:
      receive a user query from a client device;
      execute a hybrid retrieval operation comprising a paragraph retrieval operation, a triplet retrieval operation, and a graph retrieval operation, to retrieve a first set of factual information based on the user query from a plurality of diverse data sources;
      generate a context information space comprising a set of paragraph output from the paragraph retrieval operation, a set of triplet output from the triplet retrieval operation, and a set of graphs output from the graph retrieval operation;
      generate a first prompt instruction comprising the user query as well as the retrieved first set of factual information in the form of the set of paragraph output, the set of triplet output, and the set of graphs output, to feed to a generative language model to generate an intermediate rationale as explanation output,
      wherein each statement in the explanation output is linked to at least one fact reference from the first set of factual information as evidence;
      perform an automatic fact-checking operation to verify the explanation output against the retrieved first set of factual information; and
      re-feed the user query along with the generated explanation output to the generative language model to derive an answer output that is succinct in one or more language parameters as compared to the generated explanation output,
   wherein the answer output comprises a verified and evidence-supported answer and at least one fact reference from the first set of factual information, and
   wherein the triplet retrieval operation comprises concurrently performing semantic encoding and lexical encoding of the user query and searching and extracting a set of triplets from a text embedding database based on the semantic encoding and the lexical encoding.

16. The system according to claim 15, wherein the server is further configured to assign a fact identifier to each statement in the explanation output, wherein the fact identifier points to a fact taken from one of: the set of paragraph output, the set of triplet output, and the set of graphs output, to generate each statement in the explanation output.

17. The system according to claim 16, wherein the fact identifier is one of: a unique paragraph identifier pointing to one paragraph of the set of paragraph output, a unique triplet identifier pointing to the set of triplet output, and a unique graph identifier pointing to the set of graphs output.

18. The system according to claim 15, wherein the server is further configured to generate a second prompt instruction comprising the user query as well as the generated explanation output, for the re-feeding of the generative language model to generate the answer output.

19. The system according to claim 15, wherein the server is further configured to restrict the answer output based on the generated explanation output.

* * * * *